(12) United States Patent
Miyajiri et al.

(10) Patent No.: US 12,477,094 B2
(45) Date of Patent: Nov. 18, 2025

(54) IMAGE COMPOSITING DEVICE, IMAGE COMPOSITING METHOD, AND PROGRAM

(71) Applicant: KEISUUGIKEN CORPORATION, Osaka (JP)

(72) Inventors: Taku Miyajiri, Osaka (JP); Naohiro Hayaishi, Osaka (JP)

(73) Assignee: KEISUUGIKEN CORPORATION, Osaka (JP)

( * ) Notice: Subject to any disclaimer, the term of this patent is extended or adjusted under 35 U.S.C. 154(b) by 241 days.

(21) Appl. No.: 18/259,566

(22) PCT Filed: Dec. 27, 2021

(86) PCT No.: PCT/JP2021/048501
§ 371 (c)(1),
(2) Date: Jun. 24, 2024

(87) PCT Pub. No.: WO2022/145414
PCT Pub. Date: Jul. 7, 2022

(65) Prior Publication Data
US 2025/0267244 A1    Aug. 21, 2025

(30) Foreign Application Priority Data

Dec. 28, 2020 (JP) .................................. 2020-218293
Oct. 14, 2021 (JP) .................................. 2021-169080

(51) Int. Cl.
*H04N 13/293* (2018.01)
*G06T 19/20* (2011.01)
(Continued)

(52) U.S. Cl.
CPC ........... *H04N 13/293* (2018.05); *G06T 19/20* (2013.01); *H04N 13/279* (2018.05); *H04N 13/344* (2018.05); *G06T 2219/2004* (2013.01)

(58) Field of Classification Search
CPC .. H04N 13/293; H04N 13/279; H04N 13/344; G06T 19/20; G06T 2219/2004
(Continued)

(56) References Cited

U.S. PATENT DOCUMENTS

| 6,111,597 | A | 8/2000 | Tabata | |
| 6,414,681 | B1* | 7/2002 | Ohshima | H04N 13/398 345/428 |
| 2005/0089212 | A1* | 4/2005 | Mashitani | H04N 13/366 348/E13.059 |

(Continued)

FOREIGN PATENT DOCUMENTS

| JP | 10-188034 A | 7/1998 |
| JP | 2002-44683 A | 2/2002 |

(Continued)

OTHER PUBLICATIONS

International Search Reported (English translation) dated Feb. 22, 2022, from corresponding International Application No. PCT/JP2021/048501.

(Continued)

*Primary Examiner* — Tung T Vo
(74) *Attorney, Agent, or Firm* — Troutman Pepper Locke LLP

(57) ABSTRACT

An image synthesizing apparatus stores a first stereo image having a first image for the right eye and a first image for the left eye, arranges a three-dimensional object in a three-dimensional virtual space, generates a second stereo image containing a second image for the right eye, which is an image from the point of sight for the right eye in a state in which the first image for the right eye is displayed, and a second image for the left eye, which is an image from the point of sight for the left eye in a state in which the first image for the left eye is displayed, in the three-dimensional virtual space in which the three-dimensional object is arranged, and outputs the second stereo image.

13 Claims, 21 Drawing Sheets

(51) Int. Cl.
*H04N 13/279* (2018.01)
*H04N 13/344* (2018.01)

(58) Field of Classification Search
USPC .......................................................... 348/43
See application file for complete search history.

(56) References Cited

U.S. PATENT DOCUMENTS

| | | | | |
|---|---|---|---|---|
| 2012/0120207 | A1* | 5/2012 | Shimazaki | H04N 13/341 |
| | | | | 348/51 |
| 2012/0139906 | A1 | 6/2012 | Zhang et al. | |
| 2012/0249748 | A1* | 10/2012 | Nagano | G02B 27/123 |
| | | | | 348/47 |
| 2019/0158809 | A1* | 5/2019 | Sasaki | H04N 13/221 |
| 2021/0217248 | A1 | 7/2021 | Shimizu et al. | |
| 2022/0277522 | A1* | 9/2022 | Katsuki | H04N 17/00 |
| 2023/0289925 | A1* | 9/2023 | Kumagai | H04N 13/395 |

FOREIGN PATENT DOCUMENTS

| | | |
|---|---|---|
| JP | 2003-107603 A | 4/2003 |
| JP | 2005-165614 A | 6/2005 |
| JP | 2012-216077 A | 11/2012 |
| JP | 2014-505917 A | 3/2014 |
| JP | 2020071718 A | 5/2020 |
| WO | 2020/017261 A1 | 1/2020 |

OTHER PUBLICATIONS

Notice of Reasons for Refusal & English translation dated Mar. 19, 2021, from corresponding Japanese Patent Application No. 2020-218293.

Notice of Reasons for Refusal & English translation dated Jul. 13, 2021, from corresponding Japanese Patent Application No. 2020-218293.

* cited by examiner

IMAGE COMPOSITING DEVICE, IMAGE COMPOSITING METHOD, AND PROGRAM

CROSS REFERENCE TO RELATED APPLICATIONS

This is a U.S. national phase application under 35 U.S.C. 371 of International Patent Application No. PCT/JP2021/048501, filed Dec. 27, 2021, which claims benefit of priority to Japanese Patent Application No. 2021-169080, filed Oct. 14, 2021, and Japanese Patent Application No. 2020-218293, filed Dec. 28, 2020. The entire contents of these applications are hereby incorporated by reference.

FIELD OF THE INVENTION

The present invention relates to an image synthesizing apparatus and the like for synthesizing a stereo image and a three-dimensional object.

BACKGROUND

Conventionally, three-dimensional images are provided to users wearing head-mounted displays (HMDs) by displaying stereo images on the HMDs (see JP 2020-071718A, for example). Also known is three-dimensional computer graphics (3DCG) such as processing that arranges three-dimensional objects in a three-dimensional virtual space and rendering processing that generates two-dimensional images from an arbitrary point of sight.

SUMMARY

There has been no known method for properly synthesizing three-dimensional objects into stereo images. For example, there has been a problem in which, when a single two-dimensional image generated by 3DCG is synthesized into each of an image for the right eye and an image for the left eye contained in a stereo image, the three-dimensional object is two-dimensionally displayed.

The present invention was made in order to solve the above-described problem, and it is an object thereof to provide an image synthesizing apparatus and the like for properly synthesizing a three-dimensional object into a stereo image.

In order to achieve the above-described object, an aspect of the present invention is directed to an image synthesizing apparatus including: a storage unit in which a first stereo image having a first image for the right eye and a first image for the left eye is stored; an accepting unit that accepts an operation on a three-dimensional object that is arranged in a three-dimensional virtual space: an arranging unit that arranges the three-dimensional object according to the operation accepted by the accepting unit, in the three-dimensional virtual space in which the first image for the right eye and the first image for the left eye are arranged such that a first straight line connecting a point of sight for the right eye and a point corresponding to infinity in the first image for the right eye and a second straight line connecting a point of sight for the left eye and a point corresponding to infinity in the first image for the left eye intersect each other: a generating unit that generates a second stereo image containing a second image for the right eye, which is an image from the point of sight for the right eye in a state in which the first image for the right eye is displayed, and a second image for the left eye, which is an image from the point of sight for the left eye in a state in which the first image for the left eye is displayed, in the three-dimensional virtual space in which the three-dimensional object is arranged; and an output unit that outputs the second stereo image.

By utilizing this configuration, for example, it is possible to prevent a three-dimensional object to be operated from being located on the back side of a first image for the right eye and a first image for the left eye, according to the arrangement of these images in the three-dimensional virtual space. Therefore, it is possible to properly synthesize the three-dimensional object and the first stereo image. For example, even when the three-dimensional object is located on the back side of the first stereo image, it is possible to prevent the three-dimensional object from being located on the back side of the first stereo image, by moving the first image for the right eye and the first image for the left eye by a shorter distance.

Furthermore, an aspect of the present invention may be directed to the image synthesizing apparatus, wherein the first image for the right eye and the first image for the left eye are arranged such that points thereof corresponding to a predetermined distance match each other in the three-dimensional virtual space.

By utilizing this configuration, if the three-dimensional object is located closer to the front side than a predetermined distance, the three-dimensional object is not located on the back side of the first stereo image.

Furthermore, an aspect of the present invention may be directed to the image synthesizing apparatus, further including a specifying unit that specifies a distance of a given object contained in the first stereo image, wherein the predetermined distance is greater than the longest distance specified by the specifying unit.

By utilizing this configuration, if the three-dimensional object is located closer to the front side than a given object whose distance is specified by the specifying unit, the three-dimensional object is not located on the back side of the first stereo image.

Furthermore, an aspect of the present invention may be directed to the image synthesizing apparatus, wherein the given object is all objects contained in the first stereo image.

By utilizing this configuration, if the three-dimensional object is located closer to the front side than an object on the backmost side contained in the first stereo image, the three-dimensional object is not located on the back side of the first stereo image.

Furthermore, an aspect of the present invention may be directed to the image synthesizing apparatus, wherein the accepting unit also accepts information for designating the given object, and the given object is an object designated by the information accepted by the accepting unit.

By utilizing this configuration, if the three-dimensional object is located closer to the front side than an object designated by the information accepted by the accepting unit, the three-dimensional object is not located on the back side of the first stereo image.

Furthermore, an aspect of the present invention may be directed to the image synthesizing apparatus, wherein the arranging unit arranges the first stereo image so as to increase the predetermined distance, in a case in which a distance to the three-dimensional object approaches the predetermined distance.

By utilizing this configuration, it is possible to avoid a situation in which the three-dimensional object is located on the back side of the first stereo image, by rearranging the first stereo image.

Furthermore, an aspect of the present invention may be directed to the image synthesizing apparatus, wherein the first image for the right eye and the first image for the left eye are arranged such that points thereof corresponding to infinity match each other in the three-dimensional virtual space.

By utilizing this configuration, a three-dimensional object at the same distance as any object contained in the first stereo image is not located on the back side of the first stereo image.

Furthermore, an aspect of the present invention may be directed to the image synthesizing apparatus, wherein the first stereo image is an image captured by a pair of cameras arranged such that optical axes thereof are parallel to each other.

Furthermore, an aspect of the present invention may be directed to the image synthesizing apparatus, wherein the first stereo image is an image captured by a pair of cameras arranged such that optical axes thereof intersect each other.

Furthermore, an aspect of the present invention may be directed to the image synthesizing apparatus, wherein the first stereo image and the second stereo image are moving images.

By utilizing this configuration, for example, if the first stereo image is an image of surgery, it is possible to superimpose an instrument such as forceps, which is a three-dimensional object, on an instrument such as forceps contained in the first stereo image, which enables novice surgeons to imitate operations of experienced surgeons in the virtual space, and provides training for surgery.

Furthermore, an aspect of the present invention may be directed to the image synthesizing apparatus, further including a determining unit that specifies a position in the three-dimensional virtual space of an object contained in the first stereo image, from the first image for the right eye and the first image for the left eye arranged in the three-dimensional virtual space, and performs determination regarding a relationship between the specified position and the position of the three-dimensional object, wherein the output unit also performs output regarding a result of the determination by the determining unit.

By utilizing this configuration, for example, it is possible to allow a user who is operating a three-dimensional object to know whether or not the three-dimensional object is being properly operated.

Furthermore, an aspect of the present invention is directed to an image synthesizing method including: a step of accepting an operation on a three-dimensional object that is arranged in a three-dimensional virtual space: a step of arranging the three-dimensional object according to the accepted operation in the three-dimensional virtual space in which a first image for the right eye and a first image for the left eye contained in a first stereo image are arranged such that a first straight line connecting a point of sight for the right eye and a point corresponding to infinity in the first image for the right eye and a second straight line connecting a point of sight for the left eye and a point corresponding to infinity in the first image for the left eye intersect each other: a step of generating a second stereo image containing a second image for the right eye, which is an image from the point of sight for the right eye in a state in which the first image for the right eye is displayed, and a second image for the left eye, which is an image from the point of sight for the left eye in a state in which the first image for the left eye is displayed, in the three-dimensional virtual space in which the three-dimensional object is arranged; and a step of outputting the second stereo image.

Advantageous Effects of Invention

With the image synthesizing apparatus and the like according to an aspect of the invention, it is possible to properly synthesize a stereo image and a three-dimensional object.

DETAILED DESCRIPTION

Figure 1:
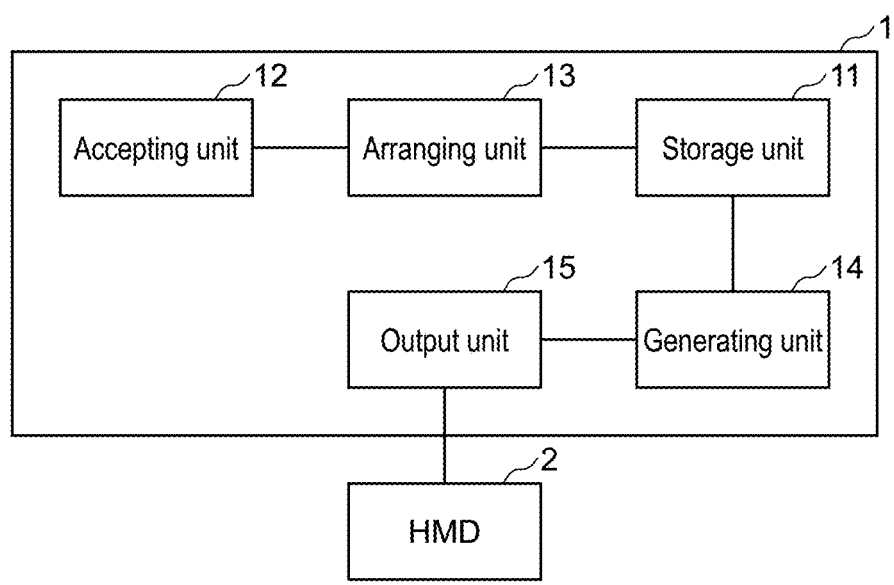
FIG. 1 is block diagram showing the configuration of an image synthesizing apparatus according to an embodiment of the present invention.

Below, an image synthesizing apparatus and an image synthesizing method according to the present invention will be described by way of an embodiment. The constituent elements and steps denoted by the same reference numerals in the embodiment described in the following embodiment are similar or corresponding constituent elements and steps, and thus a description thereof may not be repeated. The image synthesizing apparatus and the image synthesizing method according to this embodiment generate a second stereo image in which a first stereo image and a three-dimensional object are synthesized, from the first stereo image and the three-dimensional object that are arranged in a three-dimensional virtual space.

FIG. 1 is a block diagram showing the configuration of an image synthesizing apparatus 1 according to this embodiment. The image synthesizing apparatus 1 according to this embodiment includes a storage unit 11, an accepting unit 12, an arranging unit 13, a generating unit 14, and an output unit 15. The image synthesizing apparatus 1 may be, for example, a general-purpose device such as a personal computer, a smartphone, a tablet device, or a specialized device for synthesizing a stereo image and a three-dimensional object. The image synthesizing apparatus 1 may be, for example, a stand-alone device or a server device in a server-client system. In the latter case, the accepting unit 12 and the output unit 15 may accept input or output information via the Internet or other communication lines. In this embodiment, a case will be mainly described in which the image synthesizing apparatus 1 is a stand-alone apparatus.

A first stereo image having a first image for the right eye and a first image for the left eye is stored in the storage unit 11. The first stereo image may be, for example, a moving image or a still image. In this embodiment, a case will be mainly described in which the first stereo image is a moving image. The first stereo image may be, for example, a captured image or an image generated by 3DCG or the like. In this embodiment, a case will be mainly described in which the first stereo image is a captured stereo image.

In this embodiment, a case will be mainly described in which all data of the first stereo image that is a moving image is stored in the storage unit 11, but there is no limitation to this. For example, the first stereo image that is a moving image may be accepted in real time at the image synthesizing apparatus 1 and only part of the data to be processed may be stored in the storage unit 11. In this case as well, it can be said that the first stereo image is stored in the storage unit 11 because each frame constituting the first stereo image that is a moving image is at least temporarily stored in the storage unit 11.

Furthermore, in this embodiment, a case will be mainly described in which the first stereo image that is a captured image is captured by a pair of cameras arranged such that their optical axes are parallel to each other, and a case in which the first stereo image is captured by a pair of cameras arranged such that their optical axes intersect each other will be described later.

There is no limitation on the procedure in which the first stereo image is stored in the storage unit 11. For example, the first stereo image may be stored in the storage unit 11 via a recording medium, the first stereo image transmitted via a communication line or the like may be stored in the storage unit 11, or the first stereo image input from a capturing device or the like may be stored in the storage unit 11. The storage unit 11 is preferably a non-volatile recording medium, but may alternately be realized by a volatile recording medium. The recording medium may be, for example, a semiconductor memory, a magnetic disk, an optical disk, or the like.

The accepting unit 12 accepts an operation on a three-dimensional object that is arranged in a three-dimensional virtual space. This operation may be, for example, an operation related to the orientation, the position, the shape, or the like of the three-dimensional object. The operation that is accepted by the accepting unit 12 may be any operations that cause changes in the orientation, the position, the shape, or the like of the three-dimensional object arranged in the three-dimensional virtual space. The operation regarding the shape of the three-dimensional object may be, for example, an operation to open or close the tip of forceps in the case in which the three-dimensional object is forceps for use in surgery. For example, the accepting unit 12 may accept an operation on the three-dimensional object from a controller or the like of a VR (Virtual Reality) headset (e.g., Oculus Quest 2) on which the second stereo image described below is output from the image synthesizing apparatus 1, or may accept an operation on the three-dimensional object from other input devices such as a joystick or a mouse. The acceptance of an operation on the three-dimensional object may be, for example, acceptance of a result of detecting a change in position or angle in the three-dimensional real space using a sensor such as an acceleration sensor or a gyro sensor, or acceptance of input to an input device such as a button. The accepting unit 12 typically accepts an operation on the three-dimensional object in real time from an input device such as a controller or the like of an HMD 2, a VR headset, or the like. The accepting unit 12 may accept an operation on the three-dimensional object via an input device, a communication line, or the like. The accepting unit 12 may or may not include a device for acceptance (e.g., an input device, a communication device, etc.). The accepting unit 12 may be realized by hardware or software such as a driver that drives a predetermined device.

The arranging unit 13 arranges the three-dimensional object according to the operation accepted by the accepting unit 12, in the three-dimensional virtual space in which the first image for the right eye and the first image for the left eye are arranged. The position, the orientation, the shape, and the like of the three-dimensional object change according to the accepted operation, and thus the arranging unit 13 changes the three-dimensional object in the three-dimensional virtual space according to the operation. The arrangement of the three-dimensional object by the arranging unit 13 is performed according to the operation accepted by the accepting unit 12, and thus, for example, if the operations are successively accepted, the arrangement of the three-dimensional object in the three-dimensional virtual space also successively changes. The method of arranging a three-dimensional object arranged in a three-dimensional virtual space according to operations is already known, and thus a detailed description thereof has been omitted. The information on a three-dimensional object arranged in the three-dimensional virtual space may be stored, for example, in the storage unit 11.

A relationship between the arrangement positions of the first image for the right eye and the first image for the left eye contained in the first stereo image in the three-dimensional virtual space and the point of sight for the right eye and the point of sight for the left eye is typically determined in advance. The specific relationship between them will be described later, but, for example, (A) the first image for the right eye and the first image for the left eye may be arranged on the sides toward which the parallel line-of-sight directions are oriented. Also, for example, (B) the first image for the right eye and the first image for the left eye may be arranged such that the points corresponding to infinity match each other.

Typically, the three-dimensional object is arranged between the first stereo image and the points of sight. The reason for this is that, if the first stereo image is present between the three-dimensional object and the points of sight, the rendered second stereo image does not contain the three-dimensional object.

The generating unit 14 generates a second stereo image containing a second image for the right eye, which is an image from the point of sight for the right eye in a state in which the first image for the right eye is displayed, and a second image for the left eye, which is an image from the point of sight for the left eye in a state in which the first image for the left eye is displayed, in the three-dimensional virtual space in which the three-dimensional object is arranged. That is to say, when generating a second image for the right eye, it is preferable to display the first image for the right eye and not display the first image for the left eye in the three-dimensional virtual space. Also, when generating a second image for the left eye, it is preferable to display the first image for the left eye and not display the first image for the right eye in the three-dimensional virtual space. As long as the first image for the left eye is not contained in the second image for the right eye, the first image for the left eye may be displayed during rendering using the point of sight for the right eye. The same applies to rendering using the point of sight for the left eye. The second stereo image is preferably generated such that three-dimensionally displayed objects contained in the first stereo image and the three-dimensional object are three-dimensionally displayed in the second stereo image as well. The angle of view at the time of rendering may be, for example, the same as or different from the angle of view of the camera that captured the first stereo image.

The positions of the point of sight for the right eye and the point of sight for the left eye in the three-dimensional virtual space may be determined in advance or may be changed in real time, for example. In the latter case, for example, the positions of the point of sight for the right eye and the point of sight for the left eye may be changed according to the position and the orientation of the HMD 2. The arrangement of the first stereo image in the three-dimensional virtual space may also be changed according to the change in points of sight. The reason for this is that a relative relationship between the positions of the points of sight and the arrangement positions of the first image for the right eye and the first image for the left eye is typically determined in advance. The change of the points of sight according to the position and the orientation of an HMD 2 is already known, and thus a detailed description thereof has been omitted. The line-of-sight directions are preferably oriented toward the centers of the respectively corresponding images. For example, the line-of-sight direction of the point of sight for the right eye is preferably oriented toward the center of the image for the right eye. In this embodiment, for the sake of ease of description, a case will be mainly described in which the line-of-sight directions of the point of sight for the right eye and the point of sight for the left eye are horizontal directions, but it will be appreciated that the line-of-sight directions may be directions other than horizontal directions.

If the first stereo image is a moving image, the second stereo image is also a moving image because the second stereo image is generated by synthesizing each frame of the moving image and the three-dimensional object. In this case, for example, the first stereo image may be reproduced in the three-dimensional virtual space, the arrangement of the three-dimensional object may be changed according to the accepted operation, and a second stereo image containing the reproduced first stereo image and the three-dimensional object changed according to the operation may be generated. The outer frame (i.e., the outer edge) of the first stereo image may or may not be displayed in the second image for the right eye and the second image for the left eye contained in the second stereo image. In the latter case, the second stereo image may be generated such that the outer frame of the first image for the right eye (or the first image for the left eye) is the outer frame of the second image for the right eye (or the second image for the left eye).

Figure 8A:
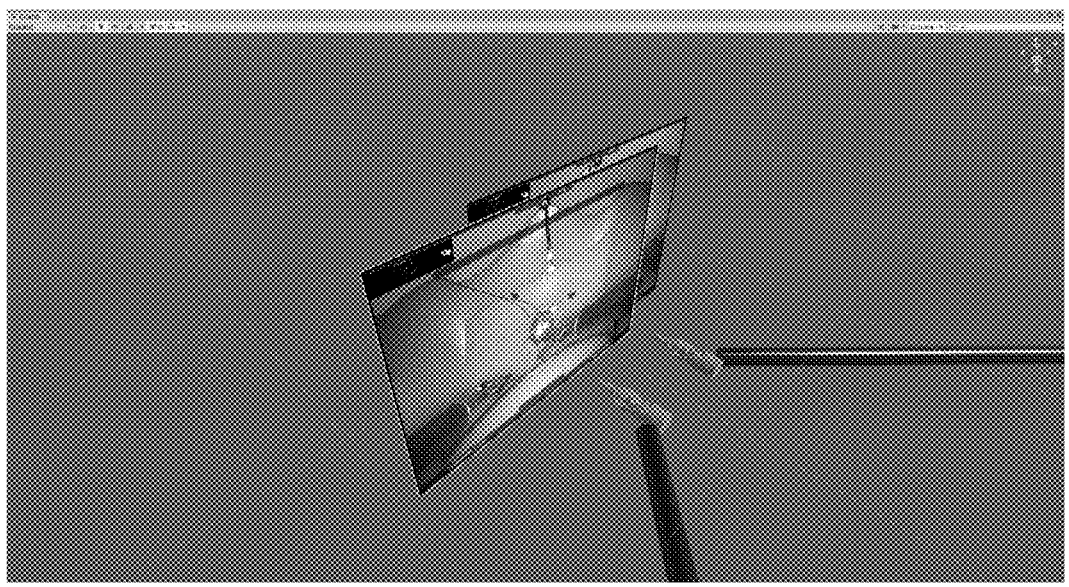
FIG. 8A is a view showing an example of a stereo image and a three-dimensional object that are arranged in a three-dimensional virtual space in the embodiment.
Figure 8B:
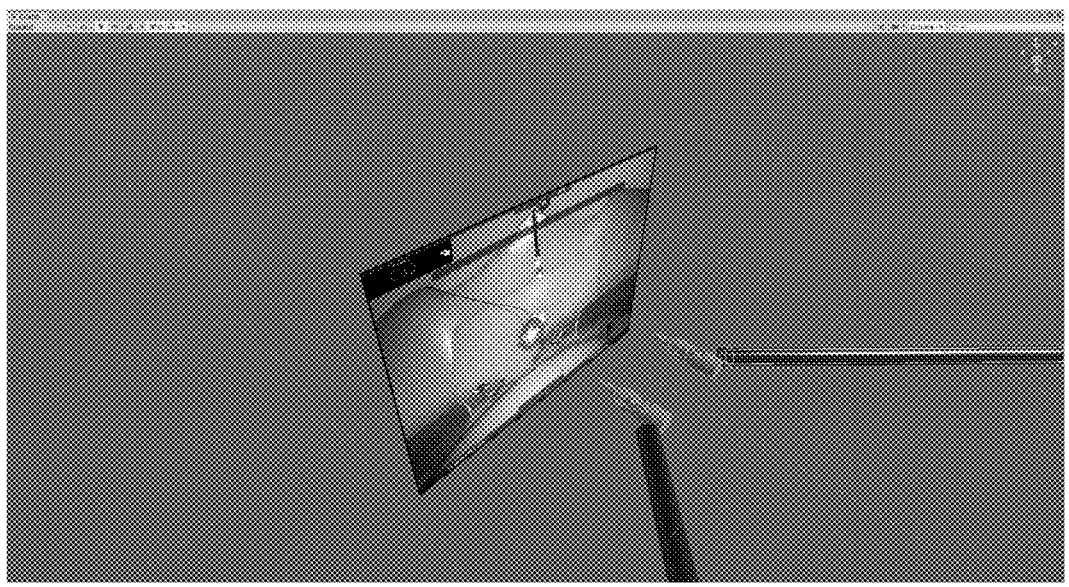
FIG. 8B is a view showing an example of a stereo image and a three-dimensional object that are arranged in a three-dimensional virtual space in the embodiment.

The arranging unit 13 and the generating unit 14 can be realized using a real-time 3D development platform such as Unity (Unity Technologies), for example. FIGS. 8A and 8B are views showing a first stereo image and surgical forceps serving as a three-dimensional object that are arranged in the three-dimensional virtual space of Unity. In FIG. 8A, the first image for the right eye and the first image for the left eye are arranged so as to be shifted from each other. For example, in the case of (A) above, the arrangement is made in this manner. Although both images originally exist on the same plane, they are slightly shifted for the sake of ease of description. In FIG. 8B, the first image for the right eye and the first image for the left eye are arranged one on top of the other. For example, in the case of (B) above, the arrangement is made in this manner. The generation of images by the generating unit 14 is known as rendering processing in 3DCG, and thus a detailed description thereof has been omitted. It will be appreciated that texture mapping and the like may be performed during such rendering.

The output unit 15 outputs the second stereo image generated by the generating unit 14. The output may be, for example, display on a display device (e.g., an HMD, a VR headset, etc.) that displays a stereo image, transmission to a predetermined device via a communication line, accumulation in a recording medium, or delivery to other constituent elements. In this embodiment, as described above, a case will be mainly described in which the output unit 15 outputs the second stereo image to the HMD 2. The output unit 15 may or may not include a device for output (e.g., a display device, a communication device, etc.). The output unit 15 may be realized by hardware or software such as a driver that drives such a device.

Next, an operation, that is, an image synthesizing method by the image synthesizing apparatus 1 according to this embodiment will be described with reference to the flowchart in FIG. 2. This flowchart describes a case in which a second stereo image is generated by synthesizing a three-dimensional object according to an operation accepted by the accepting unit 12 into a first stereo image that is a moving image stored in the storage unit 11.

(Step S101) The generating unit 14 determines whether or not to generate a second stereo image. If it generates a second stereo image, the procedure advances to step S102, or otherwise the processing in step S101 is repeated until it determines to generate a second stereo image. The generating unit 14 may, for example, periodically determine to generate a second stereo image. More specifically, the generating unit 14 may determine to generate a second stereo image at each time interval between frames of the second stereo image.

(Step S102) The accepting unit 12 determines whether or not it has accepted an operation on the three-dimensional object. If it has accepted an operation, the procedure advances to step S103, or otherwise the procedure advances to step S104.

(Step S103) The arranging unit 13 arranges the three-dimensional object in the three-dimensional virtual space according to the operation accepted by the accepting unit 12. This arrangement of the three-dimensional object may be to change the arrangement of the three-dimensional object that has been arranged in the three-dimensional virtual space, for example, to change the position, the angle, the shape, and the like of the three-dimensional object.

(Step S104) The generating unit 14 generates a second image for the right eye in a state in which the first image for the right eye is displayed and the first image for the left eye is not displayed in the three-dimensional virtual space, and generates a second image for the left eye in a state in which the first image for the left eye is displayed and the first image for the right eye is not displayed, thereby generating a second stereo image. The generation of the second image for the right eye and the second image for the left eye may be to generate one frame for the right eye and one frame for the left eye. In this case, the first image for the right eye and the first image for the left eye arranged in the three-dimensional virtual space may be changed by one frame each time the processing in step S104 is executed. The generated pair of frames may be stored, for example, in a recording medium (not shown) or the storage unit 11.

(Step S105) The output unit 15 outputs the second stereo image generated in step S104. This output may be, for example, to output one frame for the right eye and one frame for the left eye. The procedure returns to step S101. If the processing in steps S101 to S105 is repeated in this manner, a second stereo image in which the first stereo image and the three-dimensional object whose arrangement is changed according to the operation are synthesized is displayed on the HMD 2.

Figure 2:
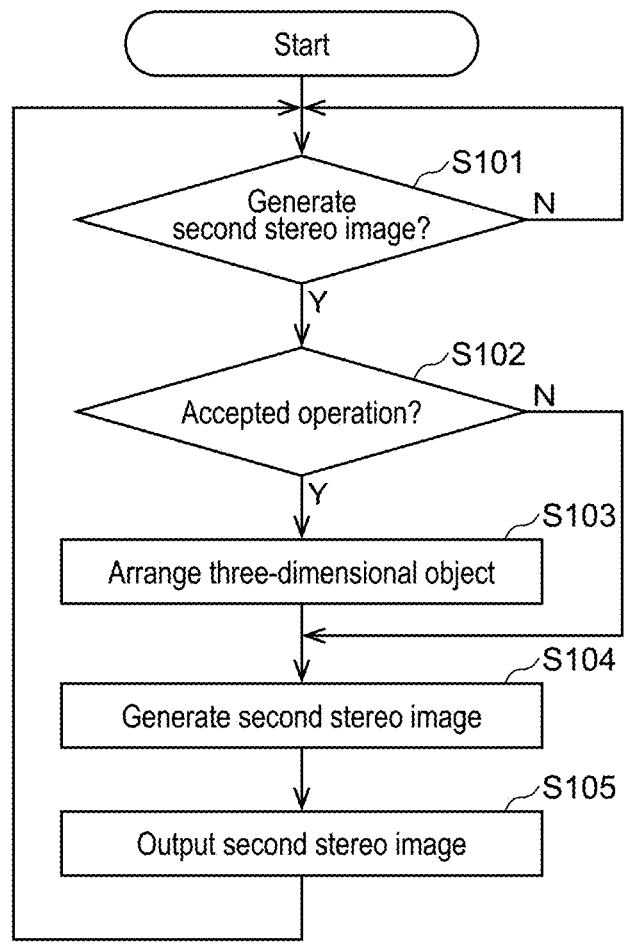
FIG. 2 is a flowchart showing an operation of the image synthesizing apparatus in the embodiment.

In the flowchart in FIG. 2, for example, the processing in steps S101, S104, and S105 and the processing in steps S102 and S103 may be performed in parallel. In the flowchart in FIG. 2, the processing ends at power off or at an interruption of termination processing.

Next, the capturing of the first stereo image and the synthesis of the first stereo image and the three-dimensional object will be specifically described.

Figure 3:
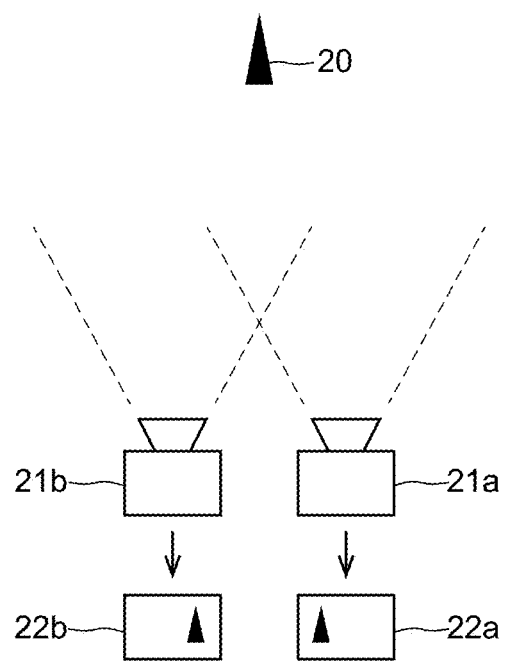
FIG. 3 is a diagram illustrating the capturing of a stereo image in the embodiment.

FIG. 3 is a diagram illustrating the capturing of a first stereo image. In FIG. 3, a first stereo image is captured using a camera 21a for the right eye and a camera 21b for the left eye. That is to say, a first image 22a for the right eye is captured by the camera 21a for the right eye, and a first image 22b for the left eye is captured by the camera 21b for the left eye. The camera 21a for the right eye and the camera 21b for the left eye typically have the same specifications, as a result of which the first image 22a for the right eye and the first image 22b for the left eye have the same pixel count. In FIG. 3, it is assumed that the first stereo image is captured by the pair of cameras 21a and 21b arranged such that their optical axes are parallel to each other. It is also assumed that the optical axes of the cameras 21a and 21b are both in the horizontal plane. The distance between the optical axis of the camera 21a for the right eye and the optical axis of the camera 21b for the left eye may be, for example, about the average human interpupillary distance. In this example, it is assumed that an object 20 whose image is to be captured is a cone with its central axis arranged in the vertical direction. It is also assumed that the object 20 is contained in the first image 22a for the right eye and the first image 22b for the left eye. Since FIG. 3 shows the state in which cameras 21a and 21b are viewed from the vertical direction that is perpendicular to the horizontal plane, the object 20 will have a circular shape in the strict sense, but, for the sake of ease of description, the object 20 is shown in a triangular shape. The same applies to other drawings.

Next, the cases in which the first image 22a for the right eye and the first image 22b for the left eye are arranged in the three-dimensional virtual space (A) on the sides toward which the parallel line-of-sight directions are oriented and (B) such that the points corresponding to infinity match each other will be described.

Figure 4A:
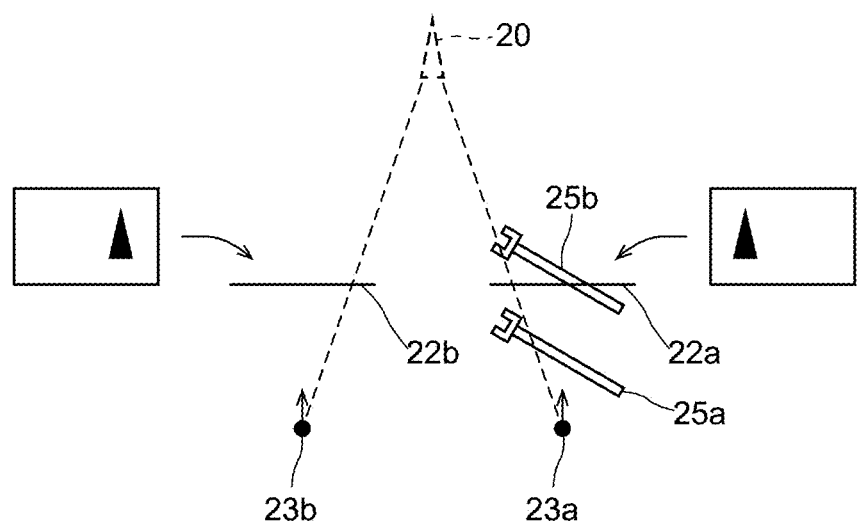
FIG. 4A is a diagram illustrating the generation of a stereo image in the embodiment.

Case (A) in which the images are arranged on the sides toward which the parallel line-of-sight directions are oriented FIG. 4A is a diagram illustrating the case in which the first image 22a for the right eye and the first image 22b for the left eye are arranged in the three-dimensional virtual space on the sides toward which the parallel line-of-sight directions are oriented. In FIG. 4A, a point 23a of sight for the right eye and a point 23b of sight for the left eye are arranged at a distance from each other that is approximately the same as the interpupillary distance or the distance between the optical axes of the stereo cameras 21a and 21b. The line-of-sight directions indicated by the arrows are parallel and in the same direction (upward in FIG. 4A). In FIG. 4A, it is assumed that the line-of-sight directions are in the horizontal plane. That is to say, it is assumed that FIG. 4A shows the state in which the points 23a and 23b of sight and the arranged images 22a and 22b are viewed from the vertical direction that is perpendicular to the horizontal plane, as with FIG. 3. The first image 22a for the right eye and the first image 22b for the left eye are arranged on the sides toward which the point 23a of sight for the right eye and the point 23b of sight for the left eye are oriented respectively such that the line-of-sight directions are orthogonal to the images and oriented toward the centers of the images. It is assumed that the positional relationship between the point 23a of sight for the right eye and the first image 22a for the right eye is the same as that between the point 23b of sight for the left eye and the first image 22b for the left eye. The first image 22a for the right eye and the first image 22b for the left eye are arranged such that they are contained on the same plane. The distance from the point 23a of sight for the right eye and the point 23b of sight for the left eye to the plane containing the first image 22a for the right eye and the first image 22b for the left eye may be, for example, U/(2 tan (φ/2)). In the formula, U is the horizontal length of the first image 22a for the right eye and the first image 22b for the left eye, and φ is the horizontal angle of view of the point 23a of sight for the right eye and the point 23b of sight for the left eye. Although FIG. 4A shows the case in which the first image 22a for the right eye and the first image 22b for the left eye arranged at a distance from each other on the right and left sides, the images may be arranged such that they partially overlap each other (see FIG. 8A, for example).

In FIG. 4A, it is assumed that a second image for the right eye from the point 23a of sight for the right eye is generated in a state in which the first image 22a for the right eye is displayed, a second image for the left eye from the point 23b of sight for the left eye is generated in a state in which the first image 22b for the left eye is displayed, and a second stereo image containing them is output to the HMD 2. Then, to a user viewing that second stereo image, the object 20 appears to exist on the back side of the arranged first image 22a for the right eye and first image 22b for the left eye, as indicated by the broken line in FIG. 4A.

Figure 4B:
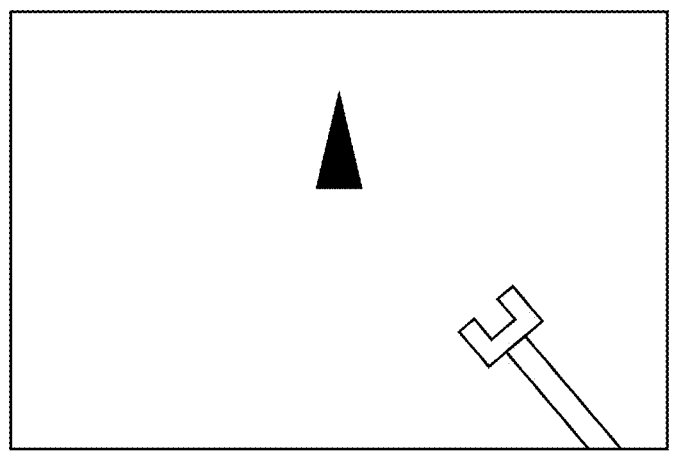
FIG. 4B is a diagram showing an example of the display of a stereo image after synthesis in the embodiment.

In FIG. 4A, it is assumed that the user wearing the HMD 2 operates a controller to arrange a three-dimensional object that is a robot hand, at the position indicated by a three-dimensional object 25a. Then, as shown in FIG. 4B, the robot hand appears to be on the front side and the object 20 appears to be on the back side to the user. Therefore, when the user wants to touch the object 20 with the robot hand, it is necessary to move the three-dimensional object to the back side, that is, to the side away from the points of sight.

Figure 4C:
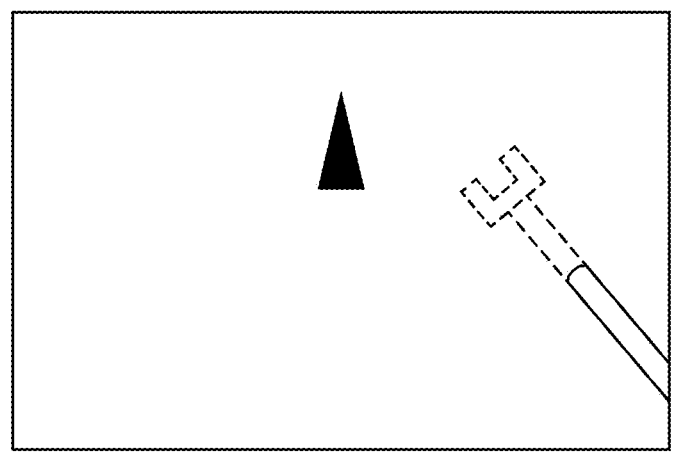
FIG. 4C is a diagram showing an example of the display of a stereo image after synthesis in the embodiment.

When the user operates the controller to move the three-dimensional object to the back side and arrange it at the position indicated by a three-dimensional object 25b, the tip of the three-dimensional object 25b is located on the back side of the first image 22a for the right eye and is not visible from the points of sight. As a result, as shown in FIG. 4C, the tip of the robot hand is not visible to the user. The reason for this is that the first image 22a for the right eye is typically opaque. In FIG. 4C, the invisible portion of the robot hand is indicated by the broken line. In this manner, if the first image 22a for the right eye and the first image 22b for the left eye are arranged on the sides toward which the parallel line-of-sight directions are oriented respectively, it becomes difficult to adjust the positional relationship between an object (e.g., the object 20) displayed in the first stereo image and the three-dimensional object. That is to say, it is difficult to superimpose them in the second stereo image. FIGS. 4B and 4C are diagrams showing the stereo image on a two-dimensional plane, which is different from the actual second stereo image. The same applies to other drawings showing a stereo image.

Although the disadvantages of arranging an image for the right eye and an image for the left eye on the sides toward which the parallel line-of-sight directions are oriented respectively were described, in the situation in which an object contained in the first stereo image and the three-dimensional object are independent, that is, in the situation in which they are not related to each other, there will be no disadvantages in synthesizing a stereo image and a three-dimensional object as described above. For example, if the first stereo image is a landscape image and the three-dimensional object is a character dancing according to a user's operation, this synthesizing method can be used because the character only needs to dance in the foreground side of the landscape.

Case (B) in which the images are arranged such that the points corresponding to infinity match each other.

Figure 5:
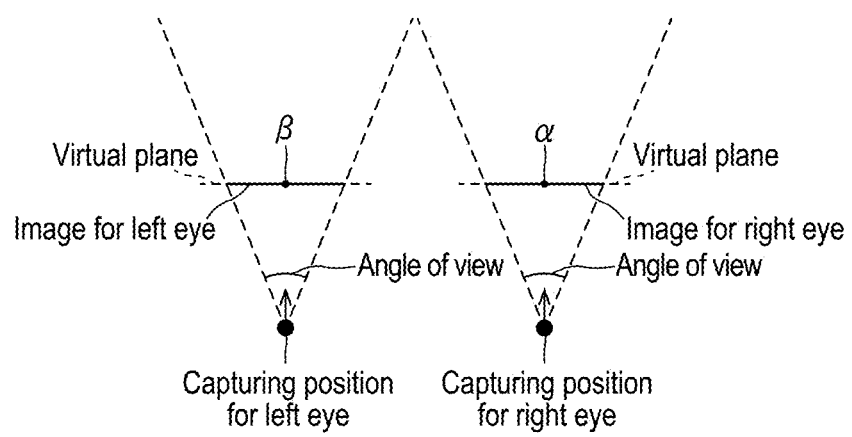
FIG. 5 is a diagram illustrating points corresponding to infinity in the embodiment.

FIG. 5 is a diagram illustrating points corresponding to infinity in a stereo image. If the capturing position for the right eye, the capturing position for the left eye, the angles of view, and the capturing directions indicated by the arrows are set as shown in FIG. 5, an image for the right eye and an image for the left eye are images obtained by respectively projecting objects and the like within the angles of view visible from the capturing position for the right eye and the capturing position for the left eye in the capturing directions, onto the virtual planes in the drawing. The virtual planes are planes perpendicular to the capturing directions. In this case, the points that exist at infinity on the sides toward which the capturing directions are oriented are projected at the positions of a point α and a point β on the virtual planes. That is to say, the point α in the image for the right eye and the point β in the image for the left eye are the points corresponding to infinity. The point α and the point β are respectively the intersecting point between the image for the right eye and the capturing direction extending from the capturing position for the right eye and the intersecting point between the image for the left eye and the capturing direction extending from the capturing position for the left eye. Accordingly, if the first image for the right eye and the first image for the left eye are arranged in the three-dimensional virtual space such that the points corresponding to infinity match each other, the images are arranged at the same position. That is to say, it is sufficient that the images are arranged one on top of the other.

Figure 6A:
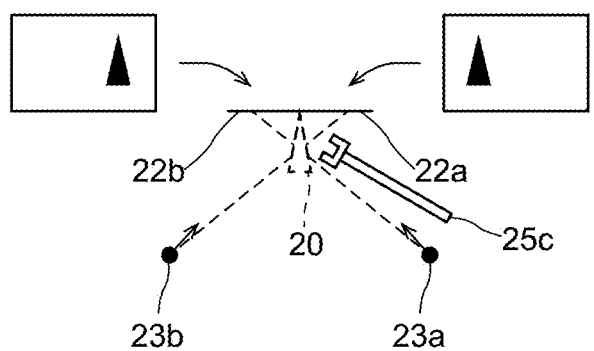
FIG. 6A is a diagram illustrating the generation of a stereo image in the embodiment.

FIG. 6A is a diagram illustrating a case in which the captured first image 22a for the right eye and first image 22b for the left eye are arranged in the three-dimensional virtual space such that the points corresponding to infinity match each other. In FIG. 6A as well, the point 23a of sight for the right eye and the point 23b of sight for the left eye are arranged at a distance from each other that is approximately the same as the interpupillary distance or the distance between the optical axes of the stereo cameras 21a and 21b, as with FIG. 4A. In this case, the line-of-sight directions indicated by the arrows are oriented toward the centers of the first image 22a for the right eye and the first image 22b for the left eye. In FIG. 6A as well, it is assumed that the line-of-sight directions are in the horizontal plane. FIG. 6A shows the state viewed from the vertical direction. The first image 22a for the right eye and the first image 22b for the left eye shown in FIG. 6A have been moved by the same distance from the positions shown in FIG. 4A until the images become arranged one on top of the other in their plane direction.

In FIG. 6A, it is assumed that a second image for the right eye from the point 23a of sight for the right eye is generated in a state in which the first image 22a for the right eye is displayed and the first image 22b for the left eye is not displayed, a second image for the left eye from the point 23b of sight for the left eye is generated in a state in which the first image 22b for the left eye is displayed and the first image 22a for the right eye is not displayed, and a second stereo image containing them is output to the HMD 2. Then, to a user viewing that second stereo image, the object 20 appears to exist on the front side of the arranged first image 22a for the right eye and first image 22b for the left eye, as indicated by the broken line in FIG. 6A.

Figure 6B:
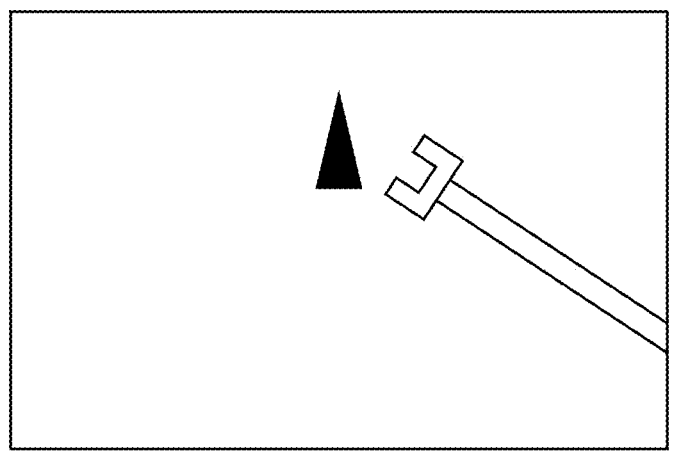
FIG. 6B is a diagram showing an example of the display of a stereo image after synthesis in the embodiment.

In FIG. 6A, it is assumed that the user wearing the HMD 2 operates a controller to arrange a three-dimensional object that is a robot hand, at the position indicated by a three-dimensional object 25c. Then, as shown in FIG. 6B, the robot hand appears to be near the object 20 to the user. Therefore, contrary to the case (A) above, the user can superimpose the tip of the robot hand on the object 20 by operating the controller. In this manner, if the first image 22a for the right eye and the first image 22b for the left eye are arranged such that the points corresponding to infinity match each other, it becomes easy to adjust the positional relationship between an object (e.g., the object 20) displayed in the first stereo image and the three-dimensional object. That is to say, it is possible to superimpose an object displayed in the stereo image and the three-dimensional object. The reason for this is that, since the point on the first image 22a for the right eye corresponding to infinity and the point on the first image 22b for the left eye corresponding to infinity match each other, the position corresponding to infinity exists on the images, and the three-dimensional object can be arranged at any position from the position that is closest to the points of sight to the infinity by moving it to a position within the range from the points of sight to the images.

Figure 7A:
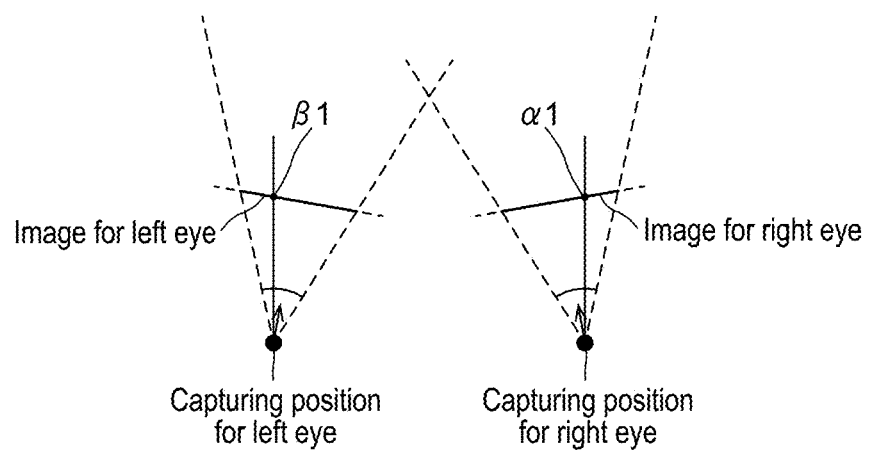
FIG. 7A is a diagram illustrating points corresponding to infinity in the embodiment.

Next, a case will be described in which a first stereo image is captured by a pair of cameras arranged such that their optical axes intersect each other. For example, when capturing a stereo image using a surgical support robot "da Vinci", the optical axes are often arranged so as to intersect each other. In this case, as shown in FIG. 7A, the capturing direction indicated by the arrow from the capturing position for the right eye (i.e., the optical axis of the camera) and the capturing direction indicated by the arrow from the capturing position for the left eye intersect each other on the sides toward which the lines of sight are oriented (i.e., the side toward which the cameras are oriented). The positions corresponding to infinity of the thus captured image for the right eye and image for the left eye are a point α1 and a point β1 in the drawing. These points are the intersecting points between two parallel straight lines extending from the capturing position for the right eye and the capturing position for the left eye such that the angles between the respective straight lines and their corresponding capturing directions are the same, and the image for the right eye and the image for the left eye. Since the situation on the right eye side is symmetrical to that on the left eye side, as long as the point al can be specified in the image for the right eye, the point 1 can also be specified in the image for the left eye. Therefore, the specifying the position of the point al in the image for the right eye will be described below.

Figure 7B:
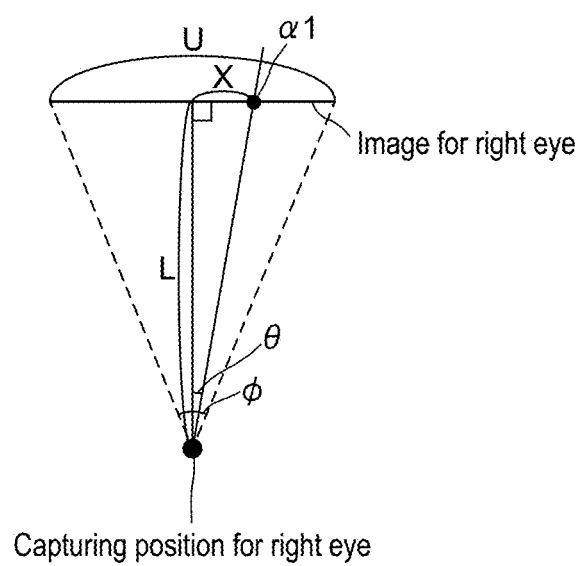
FIG. 7B is a diagram illustrating points corresponding to infinity in the embodiment.

The following equation is obtained when, as shown in FIG. 7B, the distance from the intersecting point between the capturing direction and the image for the right eye to the point al is taken as X, the distance from the capturing position for the right eye to the captured image is taken as L, the horizontal length of the image for the right eye is taken as U, the horizontal angle of view is taken as φ, and the angle between the capturing direction and the straight line connecting the capturing position for the right eye and the point al is taken as θ.

$$\tan(\varphi/2) = U/(2L)$$

$$\tan\theta = X/L$$

Thus, X is as follows.

$$X = U \times \tan\theta/(2\tan(\varphi/2))$$

Figure 6C:
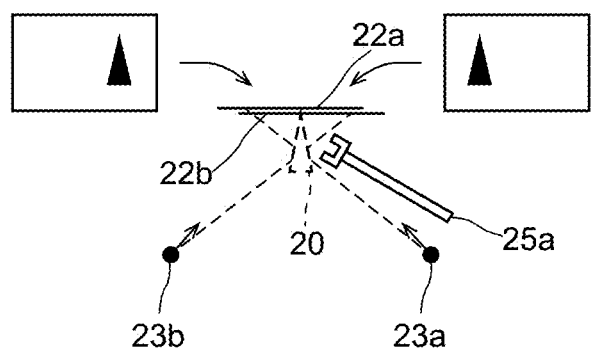
FIG. 6C is a diagram illustrating the generation of a stereo image in the embodiment.

In this formula, φ is known because it is determined by the camera used in the capturing. Also, θ is also known because 2θ is the angle formed by the line-of-sight directions on the right eye side and the left eye side in FIG. 7A. Therefore, when arranging the first image 22a for the right eye and the first image 22b for the left eye captured as in FIG. 7A such that the points corresponding to infinity match each other, it is sufficient that X is calculated as described above using U, which the horizontal width of the images, θ, and φ, and the images are arranged such that the point α1 that is at a distance from the center of the first image 22a for the right eye, by X in the horizontal direction, and the point β1 that is at a distance from the center of the first image 22b for the left eye, by X in the horizontal direction, match each other. When arranging the first image 22a for the right eye and the first image 22b for the left eye in the three-dimensional virtual space, the capturing position for the right eye in FIG. 7B may be the point of sight for the right eye. That is to say, the first image 22a for the right eye and the first image 22b for the left eye may be arranged such that the point α1 and the point β1 match each other on the plane where the distances from the point of sight for the right eye and the point of sight for the left eye arranged in the three-dimensional virtual space are both L. L=U/(2 tan (φ/2)) from the above formula. The first image 22a for the right eye and the first image 22b for the left eye are preferably arranged so as to be symmetrical with respect to a plane passing through the midpoint of the line segment connecting the point 23a of sight for the right eye and the point 23b of sight for the left eye and perpendicular to that line segment. That is to say, it is sufficient that, when the images arranged as shown in FIG. 6A are viewed from the front side, the first image 22a for the right eye is moved to the left by X in the plane containing the image, and the first image 22b for the left eye is moved to the right by X in the plane containing the image. As a result, the first image 22a for the right eye and the first image 22b for the left eye are arranged as shown in FIG. 6C. In FIG. 6C, although the first image 22a for the right eye and the first image 22b for the left eye are shifted for the sake of ease of description, the first image 22a for the right eye and the first image 22b for the left eye actually exist on the same plane. In this case as well, the line-of-sight directions are set so as to be oriented toward the centers of the respectively corresponding images. Even in the case in which a first stereo image is captured by a pair of cameras arranged such that their optical axes intersect each other in this manner, the first image for the right eye and the first image for the left eye can be arranged such that the points corresponding to infinity match each other, as a result of which the positional relationship between an object contained in the first stereo image and the three-dimensional object can be easily adjusted.

As described above, with the image synthesizing apparatus 1 and image synthesizing method according to this embodiment, the first image for the right eye and the first image for the left eye contained in the first stereo image and the three-dimensional object are arranged in the three-dimensional virtual space, a new image for the right eye is generated in a state in which the first image for the right eye is displayed, and a new image for the left eye is generated in a state in which the first image for the left eye is displayed, and thus a second stereo image in which the first stereo image and the three-dimensional object are synthesized can be generated. If the images are synthesized in this manner, a second stereo image can be generated that can three-dimensionally display both the object and the three-dimensional object contained in the stereo image. If the first image for the right eye and the first image for the left eye are arranged in the three-dimensional virtual space such that the points corresponding to infinity match each other, the positional relationship between the object and the three-dimensional object contained in the stereo image can be adjusted as appropriate. For example, it is possible to superimpose the three-dimensional object on the object contained in the stereo image. When superimposing the three-dimensional object on the object contained in the stereo image, it is possible to avoid a situation in which part of the three-dimensional object is located on the back side of the stereo image and becomes invisible.

In this embodiment, a case was mainly described in which the first and second stereo images are moving images, but there is no limitation to this. The first and second stereo images may be still images. In this case, a second stereo image is generated in which a three-dimensional object arranged according to an operation is synthesized into a first stereo image that is a still image.

Next, examples of use of the image synthesizing apparatus 1 according to this embodiment will be described.

The first stereo image may be a moving image obtained by capturing the motion of a skilled person, the three-dimensional object may correspond to an instrument or the like that is being used by the skilled person, and the user who operates the three-dimensional object may be a novice imitating the motion of the skilled person. In this case, a second stereo image is generated in which the three-dimensional object that is being operated by the novice is synthesized into the first stereo image showing the motion of the skilled person. More specifically, the motion of a skilled person may be surgical motion, motion in playing in sports, or motion in playing a musical instrument or the like. The three-dimensional object may be, for example, instruments such as forceps for use in surgery, a piece of equipment for use in sports, such as a baseball bat, a golf club, or a racket of tennis, badminton, or table tennis, a musical instrument for use in music performance, or the like. In this manner, a novice can imitate the motion of a skilled person and can practice on surgery, playing sports, playing musical instruments, and the like. In this case, it is considered important that the three-dimensional object be allowed to be superimposed on an object contained in the first stereo image, and thus it is preferable that the first stereo image and the three-dimensional object are synthesized as in (B) above.

The first stereo image may be a moving image of a human such as an actor, an actress, or a singer, the three-dimensional object may be a hand or the like of the user, and the user may be able to shake hands with the actor or the like in the virtual space by operating the hand or the like that is the three-dimensional object. In this case, the second stereo image is an image in which the human such as an actor and the hand or the like that is the three-dimensional object that is being operated by the user are synthesized. In this manner, the user will be able to shake hands with, for example, a celebrity. In this case as well, it is considered important that the three-dimensional object corresponding to the user's hand be allowed to be superimposed on the position of the hand of the celebrity or the like contained in the first stereo image, and thus it is preferable that the first stereo image and the three-dimensional object are synthesized as in (B) above.

The first stereo image may be a still image such as a captured image or computer graphics of the interior of a building, the three-dimensional object may be a piece of furniture, and the user may operate the furniture to change its arrangement and generate a second stereo image showing the status of the furniture arranged inside the building. This second stereo image allows the user to three-dimensionally view the situation after the furniture has been arranged. In this case as well, it is considered important that the three-dimensional object be allowed to be superimposed on an object contained in the first stereo image, and thus it is preferable that the first stereo image and the three-dimensional object are synthesized as in (B) above.

The first stereo image may be a moving image captured by a stereo camera worn by a user in real space such as a construction site or a repair site, the three-dimensional object may be an object corresponding to a pointer used by a skilled person to point a location in the first stereo image or an instrument used in the real space, and the second stereo image may be an image in which the three-dimensional object is synthesized into the first stereo image of the real space. The skilled person and the user in real space may view that second stereo image. The skilled person can give instructions to the user in the real space by operating the three-dimensional object, or demonstrate with the three-dimensional object what the user in the real space has to perform. The user in the real space can perform proper operations in the real space by performing the operations while viewing the second stereo image containing the three-dimensional object operated by the skilled person. In this case, the image synthesizing apparatus 1 may accept the first stereo image in real time and output the second stereo image in real time. In this case as well, it is considered important that the three-dimensional object be allowed to be superimposed on an object contained in the first stereo image, and thus it is preferable that the first stereo image and the three-dimensional object are synthesized as in (B) above.

Although some examples of use were described, it is clear that the image synthesizing apparatus 1 can be used for other examples of synthesizing a first stereo image and a three-dimensional object, and it will be appreciated that the image synthesizing apparatus 1 may be used in situations other than those described above.

Figure 9:
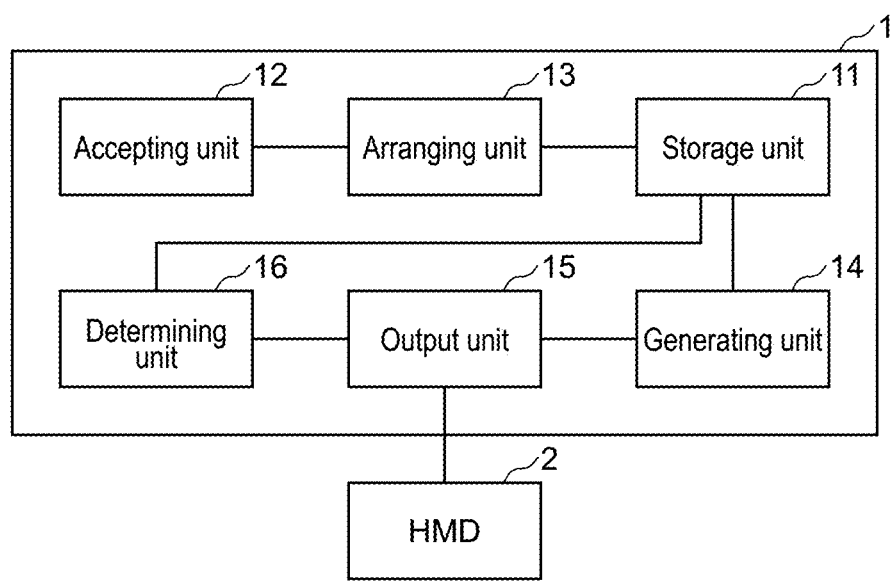
FIG. 9 is a block diagram showing another configuration of the image synthesizing apparatus in the embodiment.

Furthermore, the image synthesizing apparatus 1 may perform determination regarding the positional relationship between an object contained in the first stereo image and the three-dimensional object arranged according to the operation accepted by the accepting unit 12. The determination regarding the positional relationship may be, for example, contact determination to determine whether or not the object contained in the first stereo image and the three-dimensional object have come into contact with each other, overlap determination to determine whether or not they have overlapped each other, or any other determination on the positional relationship between them. In this case, the image synthesizing apparatus 1 may further include a determining unit 16 as shown in FIG. 9. In this case, it is important to adjust the positional relationship between an object contained in the first stereo image and the three-dimensional object, and thus it is preferable that the first stereo image and the three-dimensional object are synthesized as in (B) above.

The determining unit 16 specifies the position in the three-dimensional virtual space of the object contained in the first stereo image, from the first image for the right eye and the first image for the left eye arranged in the three-dimensional virtual space. This position specification may be performed, for example, by specifying the corresponding points of the first image for the right eye and the first image for the left eye, and specifying the position using the positions of the corresponding points in the three-dimensional virtual space and the positions of the point of sight for the right eye and the point of sight for the left eye. For example, the position in the three-dimensional virtual space corresponding to the pair of corresponding points of the first image for the right eye and the first image for the left eye may be the position of the intersecting point between a straight line connecting the corresponding point of the first image for the right eye and the point of sight for the right eye and a straight line connecting the corresponding point of the first image for the left eye and the point of sight for the left eye, in the three-dimensional virtual space. If the straight lines do not intersect each other due to an error or the like, the midpoint of the positions on the straight lines where the distance between the straight lines is closest may be the position in the three-dimensional virtual space corresponding to the pair of corresponding points of the first image for the right eye and the first image for the left eye. This processing of specifying a point in a three-dimensional space corresponding to corresponding points in stereo images in this manner is already known, and thus a detailed description thereof has been omitted. The determining unit 16 can specify the position in the three-dimensional virtual space corresponding to each pixel contained in the first image for the right eye and the first image for the left eye, by performing such processing for each corresponding point in the first stereo image. The thus specified position constitutes a plane in the three-dimensional virtual space. The reason for this is that the structure of the back side is not known from a stereo image. The determining unit 16 may also specify an object contained in an image through contour extraction or the like in the first stereo image, and specify the position for each specified object.

After specifying the position in the three-dimensional virtual space of the object contained in the first stereo image, the determining unit 16 performs determination regarding a relationship between the specified position and the position of the three-dimensional object in the three-dimensional virtual space. This determination may be at least one of the contact determination and the overlap determination. For example, if the plane constituted by the positions in the three-dimensional virtual space of the object contained in the first stereo image and at least part of the three-dimensional object in the three-dimensional virtual space overlap each other, the determining unit 16 may determine that they have come into contact with each other. Also, for example, if at least part of the plane constituted by the positions in the three-dimensional virtual space of the object contained in the first stereo image and at least part of the plane of the three-dimensional object in the three-dimensional virtual space overlap each other, the determining unit 16 may determine that they have overlapped each other. In this case, for example, an index indicating the degree of overlap may be obtained. The index may be, for example, an index indicating the degree of overlap where the overlap between the plane constituted by the positions in the three-dimensional virtual space of the object contained in the first stereo image and the plane of the three-dimensional object in the three-dimensional virtual space is greatest is taken as 100%.

The output unit 15 may also perform output regarding a result of the determination by the determining unit 16 regarding the positional relationship between the object contained in the first stereo image and the three-dimensional object. The output may be, for example, output of a result of the contact determination, output of a result of the overlap determination, output indicating that they have come into contact with each other in the case in which the result of the contact determination indicates that they have come into contact with each other, or output indicating that they have overlapped each other or output of an index indicating the degree of overlap in the case in which the result of the overlap determination indicates that they have overlapped each other. More specifically, the output unit 15 may provide output in which display according to the result of the determination is superimposed on the second stereo image, vibrate a controller that is being operated by the user according to the result of the determination, output a sound according to the result of the determination, or perform any other output according to the result of the determination. For example, when the user is operating a robot arm that is the three-dimensional object as shown in FIG. 6B and the robot arm comes into contact with a conical object contained in the first stereo image, display indicating that they have come contact with each other (e.g., blinking of the entire screen, etc.), or output of vibration or a sound indicating that they have come into contact with each other may be provided. For example, when the user is operating forceps that are the three-dimensional object as shown in FIGS. 8A and 8B and the forceps overlap forceps contained in the first stereo image that is an image of simulated surgery, display indicating that they have overlapped each other (e.g., display of a graphic indicating that they have overlapped each other, etc.) or output of an index indicating the degree of overlap may be provided. If determination regarding a relationship between the position of an object contained in the first stereo image and the position of the three-dimensional object is performed in this manner, the user who is operating the three-dimensional object can, for example, check the position of the three-dimensional object and know whether or not the three-dimensional object is being properly operated.

Figure 10:
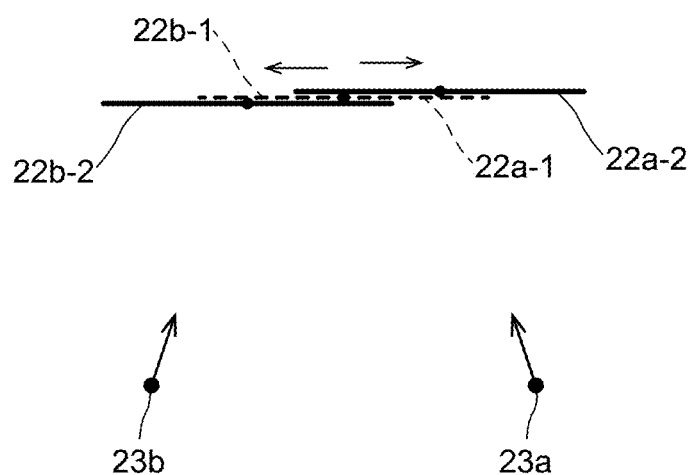
FIG. 10 is a diagram showing an example of a stereo image arranged in a three-dimensional virtual space in the embodiment.

In (B) above, the case was described in which the first image 22a for the right eye and the first image 22b for the left eye are arranged in the three-dimensional virtual space such that the points corresponding to infinity match each other, but there is no limitation to this. For example, if the three-dimensional object exists on the front side of the position that is at a predetermined distance from the points of sight (i.e., closer to the points of sight), the first image 22a for the right eye and the first image 22b for the left eye may be arranged in the three-dimensional virtual space such that the points corresponding to that predetermined distance match each other. For example, if a first image 22a-1 for the right eye and a first image 22b-1 for the left eye indicated by the broken lines in FIG. 10 are arranged such that the points corresponding to infinity match each other in the three-dimensional virtual space, the first image 22a-1 for the right eye and the first image 22b-1 for the left eye may be moved by the same distance in the directions respectively indicated by the arrows in their plane directions, as shown in a first image 22a-2 for the right eye and a first image 22b-2 for the left eye in FIG. 10. More specifically, the first image 22a-2 for the right eye may be moved to the right from the first image 22a-1 for the right eye, and the first image 22b-2 for the left eye may be moved to the left from the first image 22b-1 for the left eye. It is assumed that the first image 22b-2 for the left eye and the first image 22b-2 for the left eye are arranged in the three-dimensional virtual space such that the points corresponding to the positions that are at a distance of N meters from the points 23a and 23b of sight match each other. N is a positive real number. In FIG. 10 as well, it is assumed that the line-of-sight directions are in the horizontal plane, and the state viewed from the vertical direction is shown. The same applies to FIGS. 11 and 12. Although different reference numerals such as 22a-1 and 22a-2 are used for the first image for the right eye according to the position where it is arranged, the first image for the right eye is sometimes denoted by 22a when the position is not particularly distinguished. The same applies to the first image 22b for the left eye.

Arranging the first stereo image such that the points corresponding to the positions that are at a distance of N meters from the points 23a and 23b of sight match each other may be, for example, arranging the first image 22a-2 for the right eye and the first image 22b-2 for the left eye such that images of an object that exists N meters away from the cameras when the first stereo image is taken overlap each other. The points corresponding to the positions that are at a distance of N meters in the first image 22a for the right eye and the first image 22b for the left eye may be specified using, for example, the parallax, the focal length of the stereo cameras, or the distance between the cameras of the stereo camera. The distance may be, for example, the distance to a straight line connecting the points 23a and 23b of sight. The N meters may be specified by the user, for example. For example, the information indicating N meters may be accepted by the accepting unit 12, and the first stereo image may be accordingly arranged such that the points corresponding to the positions that are at a distance of N meters match each other in the three-dimensional virtual space. This arrangement may be performed, for example, by the arranging unit 13. In this case, the points corresponding to the positions that are at a distance of N meters in the first image 22a for the right eye and the first image 22b for the left eye may be specified using, for example, the parallax, the focal length, or the distance between the points of sight, or using other methods. For example, if information in which a distance is associated with the degree of overlap between the first image 22a for the right eye and the first image 22b for the left eye when the images are arranged such that the points corresponding to the positions that are at that distance match each other is stored in the storage unit 11, the information may be used to acquire the degree of overlap between the images corresponding to N meters, and the first image 22a for the right eye and the first image 22b for the left eye may be arranged to overlap so as to realize that degree of overlap. In FIG. 10, the positions of the points corresponding to infinity (i.e., the center points of the images) are indicated by black circles in the first image 22a for the right eye and the first image 22b for the left eye. Although the first image 22a-2 for the right eye and the first image 22b-2 for the left eye originally exist on the same plane (i.e., on the same straight line in the drawing), they are slightly shifted up and down for the sake of ease of description. The same applies to FIGS. 11 and 12.

The first stereo image is arranged as in the first image 22a-2 for the right eye and the first image 22b-2 for the left eye shown in FIG. 10, in the three-dimensional virtual space, all objects contained in the first stereo image up to N meters from the points of sight appear three-dimensionally on the front side of the first image 22a-2 for the right eye and the first image 22b-2 for the left eye. Therefore, even when an object at a distance of up to N meters contained in the first stereo image is to be touched by a three-dimensional object, it is possible to avoid a situation in which at least part of the three-dimensional object is located on the back side of the first stereo image and becomes invisible. In this manner, in the three-dimensional virtual space, it is also possible to arrange the first image 22a for the right eye and the first image 22b for the left eye such that the points corresponding to a predetermined distance match each other, instead of arranging the first image 22a for the right eye and the first image 22b for the left eye such that the points corresponding to infinity match each other. The predetermined distance may be, for example, a finite distance.

Figure 11:
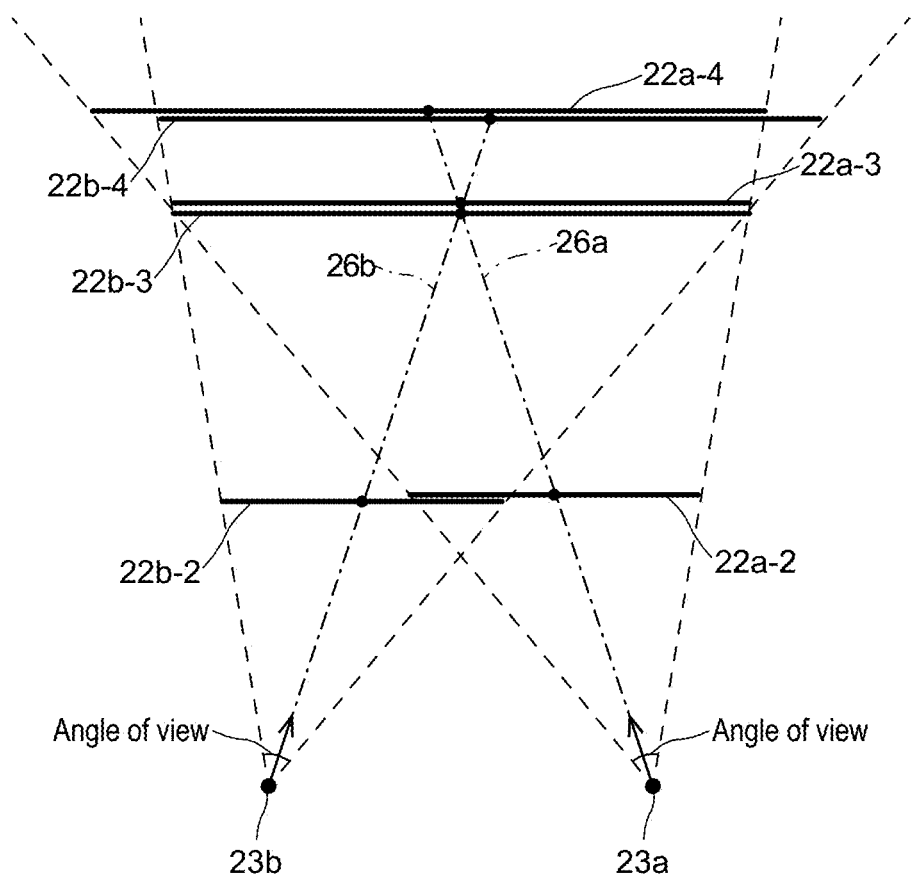
FIG. 11 is a diagram showing an example of a stereo image arranged in a three-dimensional virtual space in the embodiment.

Furthermore, as shown in FIG. 11, first images 22a-2, 22a-3, and 22a-4 for the right eye are arranged such that the angle of view from the point 23a of sight for the right eye does not change. As is clear from FIG. 11, the first image 22a-3 for the right eye arranged on the back side when viewed from the point of sight is larger than the first image 22a-2 for the right eye arranged on the front side, and the first image 22a-4 for the right eye on the back side is larger than the first image 22a-3 for the right eye arranged on the front side. It is preferable that the size of each image is changed such that the aspect ratio does not change. The same applies to first images 22b-2, 22b-3, and 22b-4 for the left eye. In FIG. 11, straight lines 26a and 26b respectively connecting the points 23a and 23b of sight and the points corresponding to infinity in the images are indicated by dash-dotted lines. The points corresponding to a predetermined distance (e.g., N meters) match each other in the first image 22a-2 for the right eye and the first image 22b-2 for the left eye, the points corresponding to infinity match each other in the first image 22a-3 for the right eye and the first image 22b-3 for the left eye, and no points match each other in the first image 22a-4 for the right eye and the first image 22b-4 for the left eye. If the first image 22a for the right eye and the first image 22b for the left eye are arranged in the three-dimensional virtual space such that the first straight line 26a connecting the point 23a of sight for the right eye and the point corresponding to infinity in the first image 22a for the right eye and the second straight line 26b connecting the point 23b of sight for the left eye and the point corresponding to infinity in the first image 22b for the left eye intersect each other in this manner, in the three-dimensional virtual space, the same situation as that in which the first image 22a for the right eye and the first image 22b for the left eye are arranged such that the points corresponding to infinity or the points corresponding to a predetermined distance match each other can be realized by arranging the first image 22a for the right eye and the first image 22b for the left eye in a manner different from that mentioned above. Thus, the first image 22a for the right eye and the first image 22b for the left eye may be arranged in the three-dimensional virtual space such that the first straight line 26a and the second straight line 26b intersect each other. In this case as well, for example, the first image 22a for the right eye and the first image 22b for the left eye are preferably arranged in the three-dimensional virtual space such that an object contained in the first stereo image and touched by or overlapped with a three-dimensional object arranged according to an operation accepted by the accepting unit 12 is three-dimensionally displayed on the front side of the first image 22a for the right eye and the first image 22b for the left eye. For example, if the distance to the object touched by or overlapped with the three-dimensional object is less than N meters, in the three-dimensional virtual space, the first stereo image may be arranged such that the points corresponding to N meters or the points corresponding to a distance greater than N meters match each other, or the first stereo image may be arranged on the back side (i.e., farther from the points of sight) of the intersecting point between the first and second straight lines 26a and 26b as with the first image 22a-4 for the right eye and the first image 22b-4 for the left eye.

Figure 12:
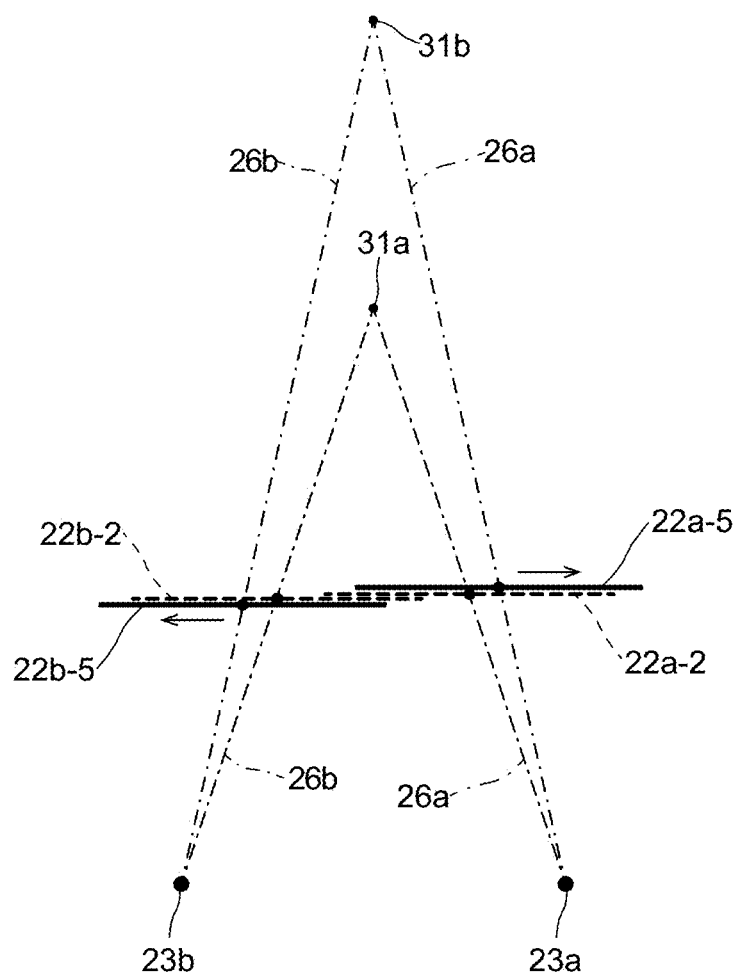
FIG. 12 is a diagram showing an example of a stereo image arranged in a three-dimensional virtual space in the embodiment.

Next, the effects of moving the first image 22a for the right eye and the first image 22b for the left eye in the plane direction will be described. FIG. 12 shows the first image 22a-2 for the right eye and the first image 22b-2 for the left eye, and a first image 22a-5 for the right eye and a first image 22b-5 for the left eye obtained by moving them by the same distance in the directions respectively indicated by the rightward and leftward arrows. The intersecting point between the straight lines 26a and 26b respectively connecting the points corresponding to infinity in the first image 22a-2 for the right eye and the first image 22b-2 for the left eye and the points 23a and 23b of sight is a point 31a, and the intersecting point between the straight lines 26a and 26b respectively connecting the points corresponding to infinity in the first image 22a-5 for the right eye and the first image 22b-5 for the left eye and the points 23a and 23b of sight is a point 31b. The points 31a and 31b are respectively the position of infinity corresponding to the first image 22a-2 for the right eye and the first image 22b-2 for the left eye arranged in the three-dimensional virtual space and the position of infinity corresponding to the first image 22a-5 for the right eye and the first image 22b-5 for the left eye. Thus, if the first stereo image is arranged as in the first image 22a-2 for the right eye and the first image 22b-2 for the left eye, it will appear to the user that all objects contained in the first stereo image are located between the points 23a and 23b of sight and the point 31a. If the first stereo image is arranged as in the first image 22a-5 for the right eye and the first image 22b-5 for the left eye, it will appear to the user that all objects contained in the first stereo image are located between the points 23a and 23b of sight and the point 31b. Thus, if the first image 22a for the right eye and the first image 22b for the left eye are moved in the direction of decreasing overlap or moved away from each other, the depth of the display range of the objects contained in the first stereo image becomes longer. On the other hand, if the first image 22a for the right eye and the first image 22b for the left eye are moved in the direction of increasing overlap or moved closer to each other, the depth of the display range of the objects contained in the first stereo image becomes shorter. Therefore, for example, if a three-dimensional object that is to be operated is intended to be superimposed on various objects contained in the first stereo image, the first image 22a for the right eye and the first image 22b for the left eye may be arranged such that the depth of the display range of the objects contained in the first stereo image becomes shorter. Such an arrangement can reduce the amount of movement of the three-dimensional object when the three-dimensional object is superimposed on various objects contained in the first stereo image. For example, the accepting unit 12 may accept information from the user to instruct to change the distance from the points 23a and 23b of sight to the intersecting point between the straight lines 26a and 26b. The arranging unit 13 may then change the arrangement of the first image 22a for the right eye and first image 22b for the left eye such that the position of the intersecting point between the straight lines 26a and 26b is changed according to the accepted information. In this manner, for example, the depth of the first stereo image may be changed according to user input. If the first image 22a for the right eye and the first image 22b for the left eye are arranged such that the straight lines 26a and 26b intersect each other, a sense of the depth of the first stereo image can also be adjusted in this manner.

Figure 13:
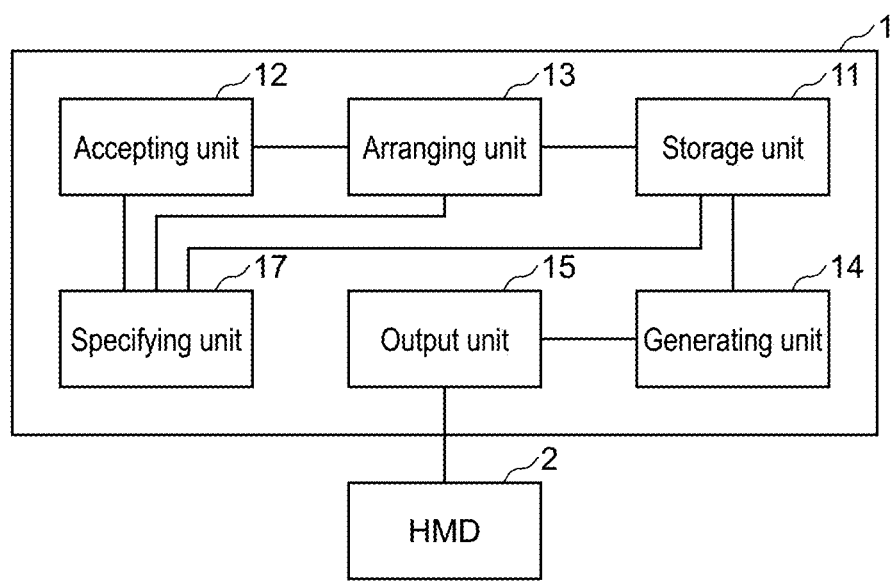
FIG. 13 is a block diagram showing another configuration of the image synthesizing apparatus in the embodiment.

Next, a case will be described in which the first image 22a for the right eye and the first image 22b for the left eye are arranged in the three-dimensional virtual space according to the distance of an object contained in the first stereo image. In this case, the image synthesizing apparatus 1 may further include a specifying unit 17 as shown in FIG. 13. As described with reference to FIG. 9, the image synthesizing apparatus 1 shown in FIG. 13 may further include the determining unit 16, and the output unit 15 may also perform output regarding a result of the determination by the determining unit 16.

The specifying unit 17 specifies a distance of a given object contained in the first stereo image. This distance may be calculated using, for example, the parallax between the first image 22a for the right eye and the first image 22b for the left eye regarding the given object, the focal length of the cameras 21a and 21b, the distance between the cameras 21a and 21b, or the like. In this manner, once the object contained in the first stereo image for which the distance is to be measured is determined, the distance to that object can be calculated. The calculated distance may be, for example, converted to a distance in the three-dimensional virtual space and used in later processing.

The object for which the distance is to be measured may be, for example, all objects contained in the first stereo image. In this case, for example, the specifying unit 17 may specify each object contained in the first stereo image, and specify the distance for each of the specified objects. The object specification may be performed, for example, through contour extraction, image segmentation, or the like. The specifying unit 17 may not specify, as an object, the background such as sky or road contained in the first stereo image, for example.

Furthermore, the object for which the distance is to be measured may be, for example, an object designated by the user. In this case, the accepting unit 12 may accept information for designating the object. The object designated by the information accepted by the accepting unit 12 may be an object for which the distance is to be measured. The information for designating the object may be, for example, information for designating the position of the object in the image, or information for designating the type of object (e.g., "hand" or "ball"). The designation of the position of the object may be performed, for example, by designating a point position or a rectangular region. The acceptance of the information for designating the type of object may be, for example, acceptance from an input device such as a keyboard, reading information from a recording medium, acceptance of voice recognition results related to voice input from a microphone or the like, or acceptance of other information for designating the type of object. In this case, the accepting unit 12 may, for example, perform multiple types of acceptance, that is, acceptance of the operation on the three-dimensional object and acceptance of the information for designating the object.

If the information for designating the object is information for designating the position of the object, the specifying unit 17 may, for example, specify the object displayed at the designated position and specify the distance of the specified object, or may specify the position in the first image 22a for the right eye and the first image 22b for the left eye corresponding to the designated position and specify the distance regarding the specified position. Alternatively, if the information for designating the object is information specifying the type of object, the specifying unit 17 may, for example, specify the object of that type in the first image 22a for the right eye and the first image 22b for the left eye, and specify the distance of the specified object. Methods for specifying an object of the accepted type include, for example, specifying the position of the object in the image by pattern matching, specifying the region of the accepted type from the type corresponding to each pixel of the image specified through image segmentation, specifying the region in the image related to the object of the accepted type through object detection, and the like.

If the information for designating the object is information for designating the position of the object, the distance specification may be performed, for example, in the frame in which the position is designated. If the information for designating the object is information for designating the type of object, the specification of the object for which the distance is to be measured may be performed for a specific frame or repeatedly performed for multiple frames in the case in which the first stereo image is a moving image, for example. In the former case, for example, when information for designating a given object is accepted by the accepting unit 12 during output of a moving image that is the second stereo image, the object specification may be performed for the frame at that time. In the latter case, that is, in the case in which the object specification is performed for multiple frames, for example, object specification may be performed for each frame at predetermined intervals. If the first stereo image is accepted in real time and the second stereo image is generated in real time using the accepted first stereo image, for example, object specification may also be performed in real time. On the other hand, if the first stereo image is stored in advance in the storage unit 11, for example, object specification may be performed in advance before the second stereo image is generated.

In the three-dimensional virtual space, the first image 22a for the right eye and the first image 22b for the left eye may be arranged such that the points corresponding to a distance greater than the longest distance specified by the specifying unit 17 match each other. With this configuration, an object specified by the specifying unit 17 is displayed on the front side of the first stereo image in the three-dimensional virtual space, and the three-dimensional object can be superimposed on that object, for example. If the distances of multiple objects are specified, the first stereo image is preferably arranged such that the points corresponding to a distance greater than the longest distance, out of the multiple distances, match each other. If the distance of an object is specified for multiple frames, for example, the first stereo image is preferably arranged such that the points corresponding to a distance greater than the longest distance, out of the specified distances, match each other. The distance greater than the specified longest distance may be, for example, a distance obtained by adding a predetermined distance to the longest specified distance. The predetermined distance to be added may be, for example, a length greater than or equal to the image misalignment that may occur when performing an operation to superimpose the three-dimensional object on an object contained in the first stereo image. With this configuration, even if such a misalignment occurs, it is possible to avoid a situation in which the three-dimensional object is located on the back side of the first stereo image. Such arrangement of the first stereo image may be performed by, for example, the arranging unit 13.

It is also possible to avoid a situation in which the three-dimensional object is located on the back side of the first image 22a for the right eye and the first image 22b for the left eye, without using the specifying unit 17. In this case, in a state in which the first stereo image is arranged in the three-dimensional virtual space such that the points corresponding to a predetermined distance match each other, if the distance to the three-dimensional object that is to be operated approaches the predetermined distance (i.e., if the three-dimensional object approaches the first stereo image), the arranging unit 13 may arrange the first stereo image so as to increase the predetermined distance. For example, if the distance obtained by adding a predetermined distance to the distance from the points 23a and 23b of sight to the three-dimensional object reaches that predetermined distance, the arranging unit 13 may rearrange the first stereo image in the three-dimensional virtual space such that the points corresponding to a distance greater than the predetermined distance match each other. The distance greater than the predetermined distance may be, for example, a distance obtained by adding a fixed distance to the predetermined distance. The arranging unit 13 may, for example, rearrange the first stereo image in real time when the second stereo image is being generated or output. Therefore, the rearrangement of the first stereo image may be repeated, for example, according to an operation on the three-dimensional object.

One method for rearranging the first stereo image is, for example, to move the first image 22a for the right eye and the first image 22b for the left eye to the back side without changing the angle of view from the points 23a and 23b of sight as shown in FIG. 11, and another method is to move the first image 22a for the right eye and the first image 22b for the left eye in the plane direction of the image without changing the distance from the points 23a and 23b of sight as shown in FIG. 12. In the latter case, the arrangement of the first stereo image is changed to change the depth perception of an object contained in the first stereo image, and accordingly change the synthesizing position of the three-dimensional object arranged in the three-dimensional virtual space. Therefore, from the point of not causing such changes, it is preferable to rearrange the first stereo image according to the method of moving the arrangement position of the first stereo image to the back side without changing the angle of view as shown in FIG. 11. The reason of why it is possible to prevent the three-dimensional object from being located on the back side of the first stereo image by moving the first stereo image by a shorter distance is that the first stereo image is arranged such that the straight lines 26a and 26b intersect each other. Thus, in this case as well, it is preferable to rearrange the first stereo image such that the straight lines 26a and 26b intersect each other.

In the case of avoiding a situation in which the three-dimensional object from being located on the back side of the first stereo image, by rearranging the first stereo image, for example, the arranging unit 13 may rearrange only the first stereo image in order to increase a predetermined distance according to the position of the three-dimensional object when the first image 22a for the right eye and the first image 22b for the left eye are arranged in the three-dimensional virtual space such that the points corresponding to that predetermined distance match each other, and may not rearrange the first stereo image in order to shorten the predetermined distance even when the position of the three-dimensional object approaches the points 23a and 23b of sight.

Furthermore, it will be appreciated that arranging the first stereo image in the three-dimensional virtual space such that the first straight line 26a and the second straight line 26b intersect each other, arranging the stereo image in the three-dimensional virtual space such that the points corresponding to a predetermined distance match each other, making the predetermined distance greater than the longest distance specified by the specifying unit 17, rearranging the first stereo image when the three-dimensional object approaches the first stereo image, and the like, for example, may be performed for the first stereo image captured by a pair of cameras arranged such that their optical axes intersect each other.

In the foregoing embodiment, each process or each function may be realized as centralized processing using a single apparatus or a single system, or may be realized as distributed processing using multiple apparatuses or multiple systems.

Furthermore, in the foregoing embodiment, information transmission performed between constituent elements may be such that, for example, if two constituent elements for transmitting information are physically different from each other, the transmission is performed by one of the constituent elements outputting the information and the other constituent element accepting the information, or alternatively, if two constituent elements for transmitting information are physically the same, the transmission is performed by shifting from a processing phase corresponding to one of the constituent elements to a processing phase corresponding to the other constituent element.

Furthermore, in the foregoing embodiment, information related to the processing that is performed by each constituent element, for example, information that is to be accepted, acquired, selected, generated, transmitted, or received by each constituent element, information such as a threshold value, a numerical expression, or an address used by each constituent element in the processing and the like may be retained in an unshown recording medium temporarily or for a long period of time even if not specified in the description above. Furthermore, the information may be accumulated in the unshown recording medium by each constituent element or by an unshown accumulating unit. Furthermore, the information may be read from the unshown recording medium by each constituent element or by an unshown reading unit.

Furthermore, in the foregoing embodiment, if information used by each constituent element or the like, for example, information such as a threshold value, an address, or various setting values used by each constituent element in the processing may be changed by a user, the user may be or may not be allowed to change such information as appropriate even if not specified in the description above. If the user is allowed to change such information, the change may be realized by, for example, an unshown accepting unit that accepts a change instruction from the user and an unshown changing unit that changes information according to the change instruction. The unshown accepting unit may accept the change instruction, for example, by accepting information from an input device, by receiving information transmitted via a communication line, or by accepting information read from a predetermined recording medium.

Furthermore, in the foregoing embodiment, if two or more constituent elements contained in the image synthesizing apparatus 1 have a communication device, an input device, or the like, the two or more constituent elements may have a physically single device or separate devices.

Furthermore, each constituent element may be configured by dedicated hardware, or alternatively, constituent elements that can be realized by software may be realized by executing a program. For example, each constituent element may be realized by a program execution unit such as a CPU reading and executing a software program stored in a recording medium such as a hard disk or a semiconductor memory. At the time of executing the program, the program execution unit may execute the program while accessing the storage unit or the recording medium. The software that realizes the image synthesizing apparatus 1 in the foregoing embodiment is a program as follows. That is, the program is a program for causing a computer capable of accessing a storage unit in which a first stereo image having a first image for the right eye and a first image for the left eye is stored, to execute: a step of accepting an operation on a three-dimensional object that is arranged in a three-dimensional virtual space: a step of arranging the three-dimensional object according to the accepted operation in the three-dimensional virtual space in which the first image for the right eye and the first image for the left eye are arranged such that a first straight line connecting a point of sight for the right eye and a point corresponding to infinity in the first image for the right eye and a second straight line connecting a point of sight for the left eye and a point corresponding to infinity in the first image for the left eye intersect each other: a step of generating a second stereo image containing a second image for the right eye, which is an image from the point of sight for the right eye in a state in which the first image for the right eye is displayed, and a second image for the left eye, which is an image from the point of sight for the left eye in a state in which the first image for the left eye is displayed, in the three-dimensional virtual space in which the three-dimensional object is arranged; and a step of outputting the second stereo image.

In the above-described program, the functions realized by the program do not include processing that can only be performed by hardware. For example, the functions realized by the program do not include at least processing that can only be performed by hardware such as a modem or an interface card in an accepting unit that accepts information, an output unit that outputs information, and the like.

Furthermore, this program may be executed by downloading from a server or the like, or may be executed by reading a program stored in a predetermined recording medium (e.g., an optical disk such as a CD-ROM, a magnetic disk, a semiconductor memory, etc.). Furthermore, the program may be used as a program for constituting a program product.

Furthermore, a computer that executes the program may be a single computer or may be multiple computers. That is to say, centralized processing may be performed, or distributed processing may be performed.

Figure 14:
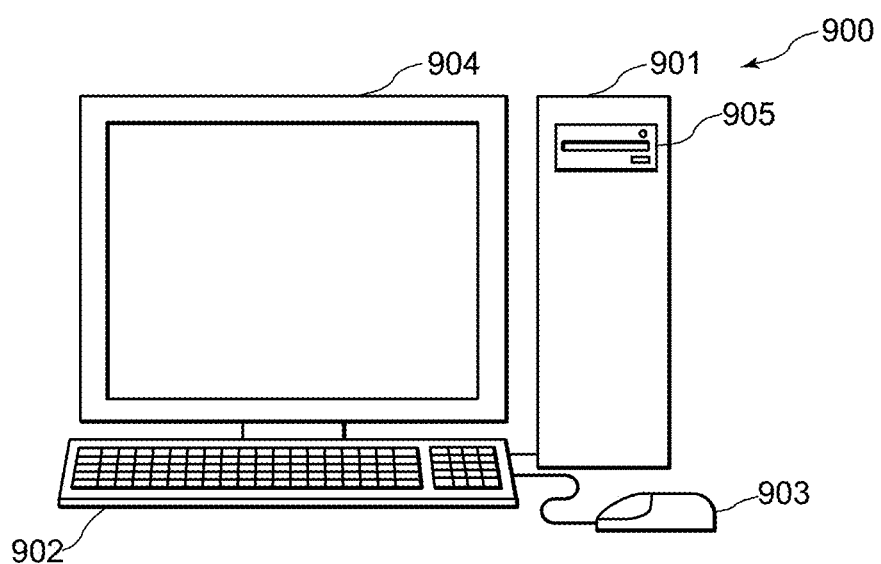
FIG. 14 is a schematic view showing an example of the external appearance of a computer system in the embodiment.

FIG. 14 is a schematic diagram showing an example of the external appearance of a computer that executes the program described in this specification to realize the image synthesizing apparatus 1 according to the foregoing embodiment. The foregoing embodiment may be realized using computer hardware and a computer program executed thereon.

In FIG. 14, a computer system 900 includes a computer 901 including a CD-ROM drive 905, a keyboard 902, a mouse 903, and a monitor 904.

Figure 15:
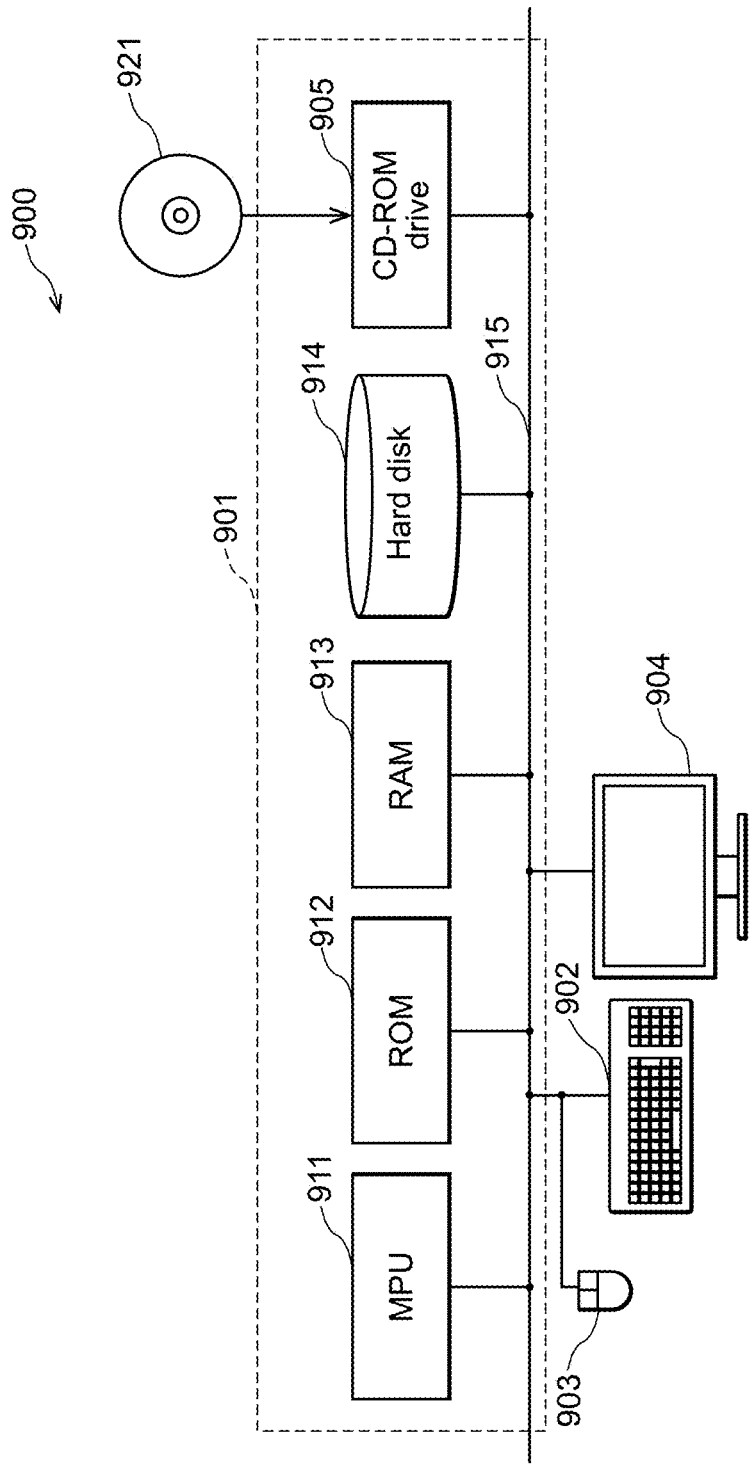
FIG. 15 is a diagram showing an example of the configuration of the computer system in the embodiment.

FIG. 15 is a diagram showing the internal configuration of the computer system 900. In FIG. 15, the computer 901 includes, in addition to the CD-ROM drive 905, an MPU (Micro Processing Unit) 911, a ROM 912 in which a program such as a boot up program is stored, a RAM 913 that is connected to the MPU 911 and is a memory in which a command of an application program is temporarily stored and a temporary storage area is provided, a hard disk 914 in which an application program, a system program, and data are stored, and a bus 915 that connects the MPU 911, the ROM 912, and the like to each other. The computer 901 may further include a network card (not shown) that provides connection to a LAN, a WAN, and the like.

The program for causing the computer system 900 to execute the functions of the image synthesizing apparatus 1 in the foregoing embodiment may be stored in a CD-ROM 921 that is inserted into the CD-ROM drive 905, and be transmitted to the hard disk 914. Alternatively, the program may be transmitted via a network (not shown) to the computer 901 and stored in the hard disk 914. At the time of execution, the program is loaded into the RAM 913. The program may be loaded from the CD-ROM 921 or directly from a network. The program may be read into the computer system 900 via other recording media (e.g., a DVD, etc.) instead of the CD-ROM 921.

The program does not necessarily have to include, for example, an operating system (OS) or a third party program to cause the computer 901 to execute the functions of the image synthesizing apparatus 1 in the foregoing embodiment. The program may only include a command portion to call an appropriate function or module in a controlled mode and obtain desired results. The manner in which the computer system 900 operates is well known, and thus a detailed description thereof has been omitted.

The present invention is not limited to the embodiment set forth herein. Various modifications are possible within the scope of the present invention.

The invention claimed is:

1. An image synthesizing apparatus comprising:
    a storage unit in which a first stereo image having a first image for the right eye and a first image for the left eye is stored;
    an accepting unit that accepts an operation on a three-dimensional object that is arranged in a three-dimensional virtual space;
    an arranging unit that arranges the three-dimensional object according to the operation accepted by the accepting unit, in the three-dimensional virtual space in which the first image for the right eye and the first image for the left eye are arranged such that a first straight line connecting a point of sight for the right eye and a point corresponding to infinity in the first image for the right eye and a second straight line connecting a point of sight for the left eye and a point corresponding to infinity in the first image for the left eye intersect each other;

a generating unit that generates a second stereo image containing a second image for the right eye, which is an image from the point of sight for the right eye in a state in which the first image for the right eye is displayed, and a second image for the left eye, which is an image from the point of sight for the left eye in a state in which the first image for the left eye is displayed, in the three-dimensional virtual space in which the three-dimensional object is arranged; and an output unit that outputs the second stereo image.

2. The image synthesizing apparatus according to claim 1, wherein the first image for the right eye and the first image for the left eye are arranged such that points thereof corresponding to a predetermined distance match each other in the three-dimensional virtual space.

3. The image synthesizing apparatus according to claim 2, further comprising a specifying unit that specifies a distance of a given object contained in the first stereo image, wherein the predetermined distance is greater than the longest distance specified by the specifying unit.

4. The image synthesizing apparatus according to claim 3, wherein the given object is all objects contained in the first stereo image.

5. The image synthesizing apparatus according to claim 3, wherein the accepting unit also accepts information for designating the given object, and the given object is an object designated by the information accepted by the accepting unit.

6. The image synthesizing apparatus according to claim 2, wherein the arranging unit arranges the first stereo image so as to increase the predetermined distance, in a case in which a distance to the three-dimensional object approaches the predetermined distance.

7. The image synthesizing apparatus according to claim 1, wherein the first image for the right eye and the first image for the left eye are arranged such that points thereof corresponding to infinity match each other in the three-dimensional virtual space.

8. The image synthesizing apparatus according to claim 1, wherein the first stereo image is an image captured by a pair of cameras arranged such that optical axes thereof are parallel to each other.

9. The image synthesizing apparatus according to claim 1, wherein the first stereo image is an image captured by a pair of cameras arranged such that optical axes thereof intersect each other.

10. The image synthesizing apparatus according to claim 1, wherein the first stereo image and the second stereo image are moving images.

11. The image synthesizing apparatus according to claim 1, further comprising a determining unit that specifies a position in the three-dimensional virtual space of an object contained in the first stereo image, from the first image for the right eye and the first image for the left eye arranged in the three-dimensional virtual space, and performs determination regarding a relationship between the specified position and the position of the three-dimensional object, wherein the output unit also performs output regarding a result of the determination by the determining unit.

12. An image synthesizing method comprising:

a step of accepting an operation on a three-dimensional object that is arranged in a three-dimensional virtual space;

a step of arranging the three-dimensional object according to the accepted operation in the three-dimensional virtual space in which a first image for the right eye and a first image for the left eye contained in a first stereo image are arranged such that a first straight line connecting a point of sight for the right eye and a point corresponding to infinity in the first image for the right eye and a second straight line connecting a point of sight for the left eye and a point corresponding to infinity in the first image for the left eye intersect each other;

a step of generating a second stereo image containing a second image for the right eye, which is an image from the point of sight for the right eye in a state in which the first image for the right eye is displayed, and a second image for the left eye, which is an image from the point of sight for the left eye in a state in which the first image for the left eye is displayed, in the three-dimensional virtual space in which the three-dimensional object is arranged; and a step of outputting the second stereo image.

13. A non-transitory computer readable medium with instructions thereon that, when executed by a processor, cause the processor to:

access a storage unit in which a first stereo image having a first image for the right eye and a first image for the left eye is stored;

accept an operation on a three-dimensional object that is arranged in a three-dimensional virtual space;

arrange the three-dimensional object according to the accepted operation in the three-dimensional virtual space in which the first image for the right eye and the first image for the left eye are arranged such that a first straight line connecting a point of sight for the right eye and a point corresponding to infinity in the first image for the right eye and a second straight line connecting a point of sight for the left eye and a point corresponding to infinity in the first image for the left eye intersect each other;

generate a second stereo image containing a second image for the right eye, which is an image from the point of sight for the right eye in a state in which the first image for the right eye is displayed, and a second image for the left eye, which is an image from the point of sight for the left eye in a state in which the first image for the left eye is displayed, in the three-dimensional virtual space in which the three-dimensional object is arranged; and output the second stereo image.

\* \* \* \* \*